(12) United States Patent
Liao

(10) Patent No.: US 12,151,201 B2
(45) Date of Patent: Nov. 26, 2024

(54) DEODORIZING DEVICE AND INTELLIGENT TOILET

(71) Applicant: Shanghai Kohler Electronics, Ltd., Shanghai (CN)

(72) Inventor: Desheng Liao, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 1063 days.

(21) Appl. No.: 17/085,164

(22) Filed: Oct. 30, 2020

(65) Prior Publication Data
US 2021/0129073 A1    May 6, 2021

(30) Foreign Application Priority Data

Nov. 6, 2019   (CN) .......................... 201911075134.9
Nov. 6, 2019   (CN) .......................... 201921899012.7

(51) Int. Cl.
*B01D 53/14*  (2006.01)
*B01D 53/18*  (2006.01)
*E03D 9/052*  (2006.01)

(52) U.S. Cl.
CPC .......... *B01D 53/1468* (2013.01); *B01D 53/18* (2013.01); *E03D 9/052* (2013.01); *B01D 2252/103* (2013.01)

(58) Field of Classification Search
CPC ...................................................... E03D 9/052
See application file for complete search history.

(56) References Cited

U.S. PATENT DOCUMENTS

| 2008/0010731 | A1* | 1/2008 | Martin ...................... C02F 1/78 4/213 |
| 2016/0250370 | A1 | 9/2016 | Orito et al. |

FOREIGN PATENT DOCUMENTS

| CN | 1477273 A | 2/2004 |
| CN | 2770562 Y | 4/2006 |
| CN | 201056757 Y | 5/2008 |
| CN | 105879540 A | 8/2016 |
| CN | 207146648 U | 3/2018 |
| CN | 109173610 A * | 1/2019 |

(Continued)

OTHER PUBLICATIONS

Chinese Office Action for Chinese Application No. 201911075134.9 dated Jun. 28, 2021.

*Primary Examiner* — Christine J Skubinna
(74) *Attorney, Agent, or Firm* — Lempia Summerfield Katz LLC

(57) ABSTRACT

The present disclosure discloses a deodorizing device comprising a housing, an air suction assembly, a water storage chamber and a mixing chamber arranged in the housing. The mixing chamber is located between the air suction assembly and the housing; the air suction assembly is used for sucking odor, the odor and water vapor are mixed and deodorized in the mixing chamber; clean air after deodorization is discharged from the housing. The present disclosure sucks odor by air suction assembly, makes the odor and water vapor mix in the mixing chamber to deodorize. The clean air after deodorization can be discharged from air outlet pipe. Because the main substances in the odor can be dissolved in water and react mutually after the dissolution. Thus, the odor can be decomposed and filtrated and the clean air after deodorization can be discharged outside the deodorizing device.

16 Claims, 33 Drawing Sheets

(56) References Cited

FOREIGN PATENT DOCUMENTS

| | | | |
|---|---|---|---|
| CN | 208419021 U | | 1/2019 |
| CN | 109990407 A | | 7/2019 |
| CN | 109990407 B | * | 7/2021 |

* cited by examiner

DEODORIZING DEVICE AND INTELLIGENT TOILET

CROSS REFERENCE TO RELATED APPLICATION

This application claims the benefit of priority to: Chinese Patent Application No. 201911075134.9 filed in the Chinese Intellectual Property Office on Nov. 6, 2019, which is hereby incorporated by reference in its entirety; Chinese Patent Application No. 201921899012.7 filed in the Chinese Intellectual Property Office on Nov. 6, 2019, which is hereby incorporated by reference in its entirety.

FIELD

The present disclosure relates to intelligent bathroom technical field, especially to a deodorizing device and an intelligent toilet.

BACKGROUND

At present, the deodorizing device of existing product usually adopts a deodorizing module using activated carbon as base material with adsorption grid micropores and some metallic oxide attached. The deodorizing fan sucks odor into a deodorizing channel. Then the odor passes through the grid micropores in the deodorizing module using the activated carbon as the base material and reacts with the metallic oxide attached thereon. The odor substance is also adsorbed by the surface of the activated carbon. Because activated carbon usually has a small volume, so the time that odor passes through the activated carbon is too short. Therefore, the odor doesn't have enough time to be adsorbed by the activated carbon or decomposed by the metallic oxide, which causes a low deodorizing efficiency per unit time for activated carbon. In addition, since the deodorizing efficiency of the deodorizing module will gradually decrease as the metallic oxide attached to it is gradually decomposed, users need to periodically replace the deodorizing module of the product to maintain effective deodorization, which increases the cost of use.

Therefore, there is a need to design a deodorizing device and an intelligent toilet whose deodorizing efficiencies are high but the costs are low.

SUMMARY

The objective of the present disclosure is to overcome the defects in the existing technologies and provide a deodorizing device and an intelligent toilet with high deodorizing efficiency and low cost.

The present disclosure provides a deodorizing device comprising a housing, an air suction assembly, a water storage chamber and a mixing chamber arranged in the housing; wherein the mixing chamber is located between the air suction assembly and the housing; the air suction assembly is used for sucking odor, the odor and water vapor are mixed and deodorized in the mixing chamber; the clean air after deodorization is discharged from the housing.

In an embodiment, the air suction assembly includes a drive motor, a vane wheel and a fine screen; the drive motor is used to drive the vane wheel to rotate; the mixing chamber is located between the fine screen and the housing.

In an embodiment, the fine screen is arranged on the outer periphery of the vane wheel.

In an embodiment, the water storage chamber is located below the mixing chamber, the vane wheel and the fine screen partly enter into the water storage chamber.

In an embodiment, the housing includes an air inlet, the lower part of the air inlet is provided with a water retaining plate.

In an embodiment, the deodorizing device further includes a mist spraying assembly used for spraying water mist towards the air suction assembly.

In an embodiment, the mist spraying assembly sucks water from the water storage chamber.

In an embodiment, the mist spraying assembly includes a water pump, a water pump water inlet pipe, a water pump water outlet pipe and a mist spraying head; the water pump water outlet pipe is connected to the water pump and the mist spraying head, the mist spraying head is used to spray water to the inside of the vane wheel.

In an embodiment, the water pump water inlet pipe is connected to the water storage chamber and the water pump.

In an embodiment, the mist spraying head is located inside the vane wheel.

In an embodiment, the deodorizing device further includes a transmission assembly, the transmission assembly includes a motor drive gear, an intermediate transmission shaft, an intermediate transmission gear, a vane wheel transmission gear, and a vane wheel transmission shaft;

the motor drive gear is mounted on the drive shaft of the drive motor, the intermediate transmission gear is mounted on the intermediate transmission shaft, the vane wheel transmission gear is mounted on the vane wheel transmission shaft, and the motor drive gear meshes with the intermediate transmission gear and the vane wheel transmission gear, and the intermediate transmission gear is used to drive the water pump to rotate.

In an embodiment, the water pump is a gear pump, and the gear pump includes a water pump lower transmission shaft, a water pump lower transmission gear, a water pump upper transmission shaft, and two water pump front gears; the intermediate transmission gear meshes with the water pump lower transmission gear, the water pump lower transmission gear is mounted on the water pump lower transmission shaft, and the water pump lower transmission shaft drives the water pump upper transmission shaft to rotate; one of the water pump front gears is mounted on the water pump upper transmission shaft, and the two water pump front gears mesh with each other.

In an embodiment, the vane wheel includes at least two layers of coaxially arranged vane group with different diameters, and each layer of the vane group is covered with a ring of the fine screen.

In an embodiment, the deodorizing device further comprises an air inlet pipe and an air outlet pipe connected with the housing, and the air outlet pipe is arranged to extend obliquely upward from the mixing chamber, and the rear end of the air outlet pipe is provided with a filter screen.

The present disclosure also provides an intelligent toilet comprising a pedestal and a machine cover. The intelligent toilet further includes a deodorizing device, wherein the deodorizing device is arranged inside the pedestal and the machine cover.

In an embodiment, the deodorizing device further includes an air inlet pipe and an air outlet pipe connected with the housing, an air inlet end of the air inlet pipe is connected with the pedestal, an air outlet end of the air outlet pipe protrudes from the side of the machine cover.

After adopting the above-mentioned technical solutions, these following beneficial technical effects can be achieved accordingly:

By means of using air suction assembly to suck odor, making the odor and water vapor mix in the mixing chamber to deodorize. The clean air after deodorization can be discharged from air outlet pipe. Because the main substances in the odor (i.e. ammonia and hydrogen sulfide, etc.) can be dissolved in water and react mutually after the dissolution, the odor can be decomposed and filtrated, the clean air after deodorization can be discharged outside the deodorizing device, and the process of deodorization is achieved finally.

The objective of the present disclosure is to overcome the defects in the existing technologies and provide a deodorizing device with high deodorizing efficiency and low cost.

The present disclosure provides a deodorizing device comprising a housing, an air inlet pipe and an air outlet pipe respectively connected to the housing, an air suction assembly, a water storage chamber and a mixing chamber arranged in the housing; wherein the mixing chamber is located between the air suction assembly and the housing; the air suction assembly is used for sucking odor from the air inlet pipe; the odor and water vapor are mixed and deodorized in the mixing chamber; the clean air after deodorization is discharged from the air outlet pipe.

In an embodiment, the mixing chamber includes a first mixing chamber and a second mixing chamber that are connected to each other through a connecting channel; the air inlet pipe is connected to the first mixing chamber directly, and the air outlet pipe is connected to the second mixing chamber.

In an embodiment, the air suction assembly includes a drive motor, a drive shaft, an intermediate drive gear, a first vane wheel, a second vane wheel, a first fine screen, a second fine screen; the drive motor is used to drive the drive shaft to rotate; the intermediate drive gear is nested on the drive shaft and drives the first vane wheel and the second vane wheel to rotate; the first vane wheel and the first fine screen are located inside the first mixing chamber, the second vane wheel and the second fine screen are located inside the second mixing chamber.

In an embodiment, the first fine screen is arranged on the outer periphery of the first vane wheel, the second fine screen is arranged on the outer periphery of the second vane wheel.

In an embodiment, the air suction assembly further includes a first side gear and a second side gear, the intermediate drive gear meshes with the first side gear and the second side gear respectively; the first side gear drives the first vane wheel to rotate, the second side gear drives the second vane wheel to rotate.

In an embodiment, the water storage chamber is located below the first mixing chamber and the second mixing chamber; the first vane wheel, the second vane wheel, the first fine screen and the second fine screen partly enter into the water storage chamber.

In an embodiment, the housing includes an air inlet, the lower part of the connection between the air inlet and the air inlet pipe is provided with a water retaining plate.

In an embodiment, the deodorizing device further includes a mist spraying assembly used for spraying water mist towards the air suction assembly.

In an embodiment, the mist spraying assembly sucks water from the water storage chamber.

In an embodiment, the mist spraying assembly includes a water pump, a water pump water inlet pipe, a water pump water outlet pipe, a first mist spraying head and a second mist spraying head; the water pump water outlet pipe is connected to the water pump as well as the first mist spraying head and the second mist spraying head; the first mist spraying head is used to spray water to the inside of the first vane wheel, the second mist spraying head is used to spray water to the inside of the second vane wheel.

In an embodiment, the water pump water inlet pipe is connected to the water storage chamber and the water pump.

In an embodiment, the first mist spraying head stretches into the inside of the first vane wheel, the second mist spraying head stretches into the inside of the second vane wheel.

In an embodiment, the mist spraying assembly further includes a first mist spraying head water inlet pipe and a second mist spraying head water inlet pipe; the first mist spraying head water inlet pipe is connected to the water pump water outlet pipe and the first mist spraying head, the second mist spraying head water inlet pipe is connected to the water pump water outlet pipe and the second mist spraying head.

In an embodiment, the housing includes a housing main body, a front cover, a motor fixing rear plate, a top cover and a water storage chamber bottom plate;

the housing main body is provided with the first mixing chamber and the second mixing chamber inside, the front side of the housing main body is provided with the air inlet and a connecting channel opening;

the front cover is arranged to cover the connecting channel opening;

the motor fixing rear plate is connected to the rear side of the housing main body, the drive motor is mounted at the rear side of the motor fixing rear plate, the drive shaft passes through the motor fixing rear plate and enters into a transmission chamber between the housing main body and the motor fixing rear plate, the intermediate drive gear, the first side gear and the second side gear are arranged inside the transmission chamber;

the top cover is connected to the top part of the housing main body for sealing the upper parts of the first mixing chamber, the connecting channel and the second mixing chamber;

the water storage chamber bottom plate is connected to the bottom part of the housing main body, the water storage chamber is formed therebetween.

After adopting the above-mentioned technical solutions, these following beneficial technical effects can be achieved accordingly:

By means of using air suction assembly to suck odor, making the odor and water vapor mix in the mixing chamber to deodorize. The clean air after deodorization can be discharged from air outlet pipe. Because the main substances in the odor (i.e. ammonia and hydrogen sulfide, etc.) can be dissolved in water and react mutually after the dissolution, the odor can be decomposed and filtrated, the clean air after deodorization can be discharged outside the deodorizing device, and the process of deodorization is achieved finally.

BRIEF DESCRIPTION OF THE FIGURES

Please refer to the attached figures, and the present disclosure should become easier to understand. It should be understood that these figures are used for illustrative purposes only and are not intended to limit the scope of protection of the present disclosure. In the Drawings.

Figure 1:
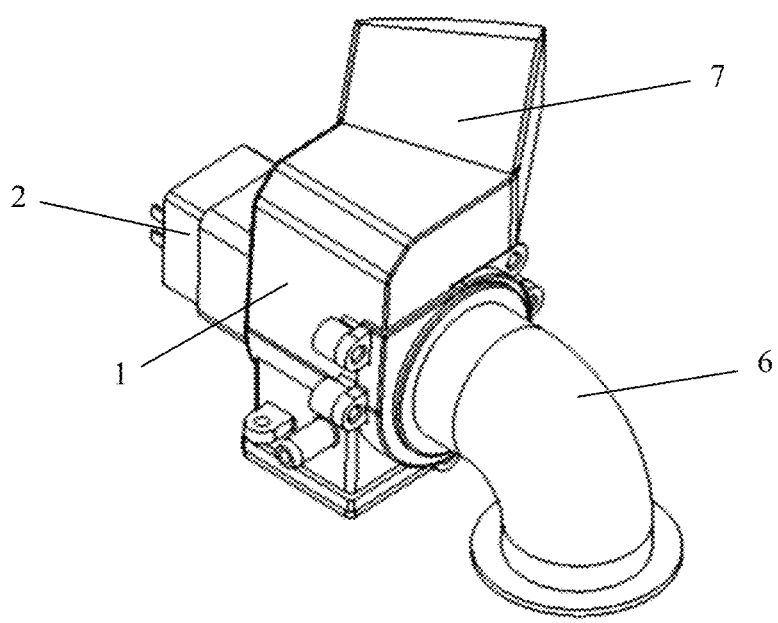
FIG. 1 is a perspective view of the deodorizing device in the first embodiment of a first example according to the present disclosure.

List of the reference signs used in the figures related to the first example according to the present disclosure:

housing 1: water storage chamber 11, mixing chamber 12, air inlet 13, bottom plate 14, gear box rear housing 15, water inlet 111, small hole 121;

air suction assembly 2: drive motor 21, vane wheel 22, fine screen 23, drive shaft 24, inner vane wheel 221, outer vane wheel 222, inner vane wheel screen 231, outer vane wheel screen 232;

water retaining plate 3;

mist spraying assembly 4: water pump 41, water pump water inlet pipe 42, water pump water outlet pipe 43, mist spraying head 44, water pump lower drive shaft 411, water pump lower drive gear 412, water pump upper drive shaft 413, water pump front gear 414, water pump front end cover 415, water pump rear end cover 416, water pump rear sealing ring 417; gear pump water suction chamber 418; gear pump water outlet chamber 419;

transmission assembly 5: motor drive gear 51, intermediate transmission shaft 52, intermediate transmission gear 53, vane wheel transmission shaft 54, vane wheel transmission gear 55;

air inlet pipe 6: air inlet end 61;

air outlet pipe 7: air outlet end 71;

sealing structure 8, air inlet pipe 10, machine cover 20, deodorizing exhaust window 201.

List of the reference signs used in the figures related to the second example according to the present disclosure:

housing 1: water storage chamber 11, mixing chamber 12, top cover 13', water storage chamber bottom plate 14', connecting channel 16, housing main body 17, front cover 18, motor fixing rear plate 19, first mixing chamber 122, second mixing chamber 123, air inlet 171, connecting channel opening 172, transmission chamber 191;

air suction assembly 2: drive motor 21, intermediate drive gear 22', fine screen 23, drive shaft 24, first side gear 25, second side gear 26, first vane wheel 221', second vane wheel 222', first fine screen 231', second fine screen 232', first vane wheel drive shaft 223, second vane wheel drive shaft 224;

mist spraying assembly 4: water pump 41, water pump water inlet pipe 42, water pump water outlet pipe 43, first mist spraying head 45, second mist spraying head 46, first mist spraying head water inlet pipe 47, second mist spraying head water inlet pipe 48, three-way valve 49;

water retaining plate 3, air inlet pipe 6, air outlet pipe 7.

DETAILED DESCRIPTION

The specific embodiments of the present disclosure is further described below in conjunction with the drawings.

It should be easy to understand that, according to the technical solutions of the present disclosure, there are multiple structural modes and implementation modes that can be replaced by one of the ordinary skilled in the art without changing the essential spirit of the present disclosure. Therefore, the following specific embodiments and drawings are only exemplary descriptions of the technical solutions of the present disclosure and should not be regarded as all of the present disclosure or as a limitation or restriction to the technical solutions of the present disclosure.

The directional terms such as up, down, left, right, front, back, front side, back side, top, bottom, etc., mentioned or may be mentioned in this specification are defined relative to the structure shown in the drawings, and they are the relative concept, therefore, they may change accordingly according to different locations and different usage conditions. Therefore, these or other orientation terms should not be interpreted as restrictive terms.

FIRST EXAMPLE

First Embodiment of the First Example

Figure 2:
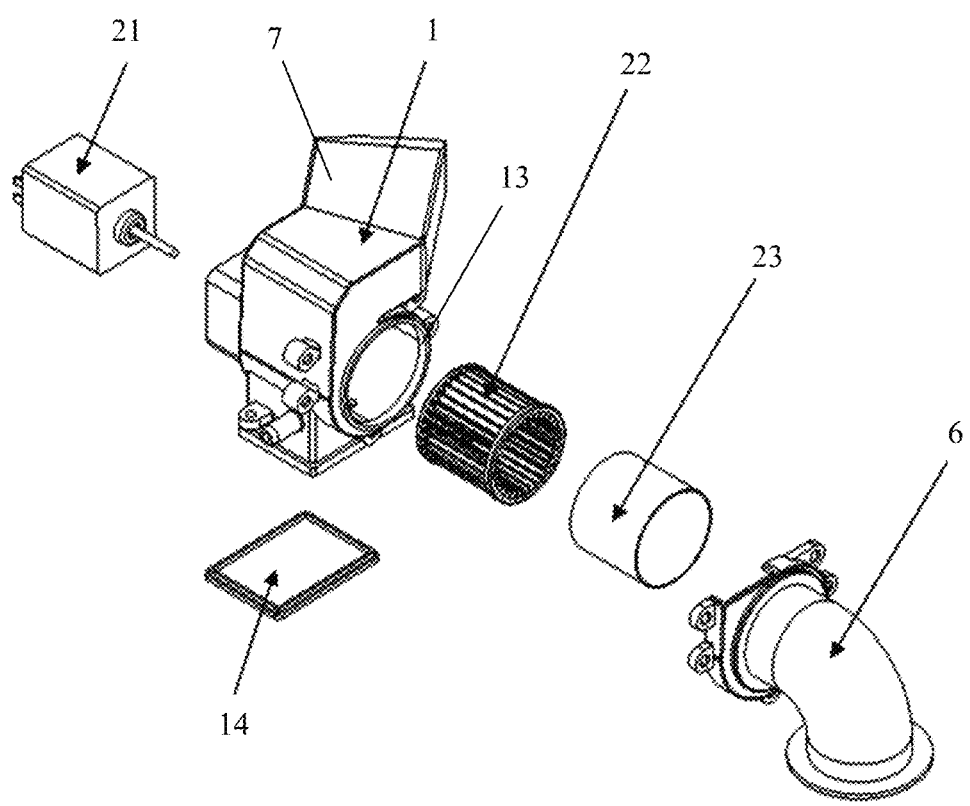
FIG. 2 is an exploded view of the deodorizing device in the first embodiment of the first example according to the present disclosure.
Figure 3:
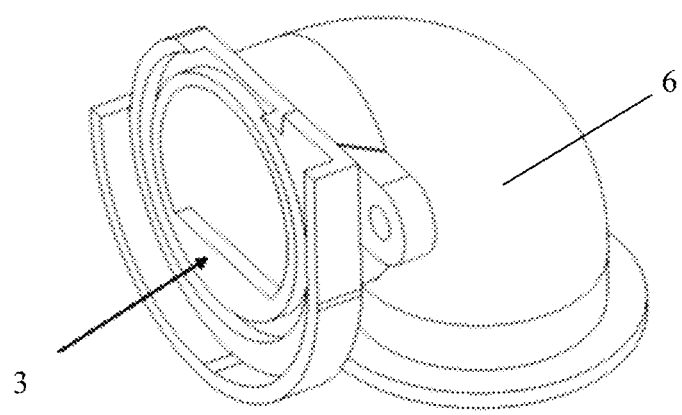
FIG. 3 is a perspective view of an air inlet pipe of the deodorizing device in the first embodiment of the first example according to the present disclosure.
Figure 4:
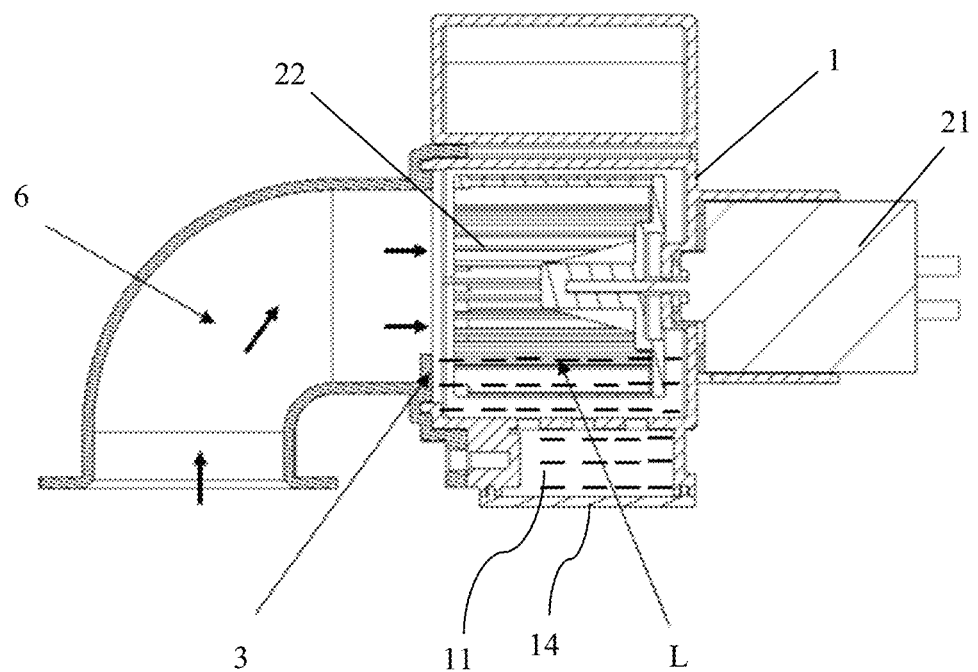
FIG. 4 is a longitudinal sectional view along the axial direction of the deodorizing device in the first embodiment of the first example according to the present disclosure.
Figure 5:
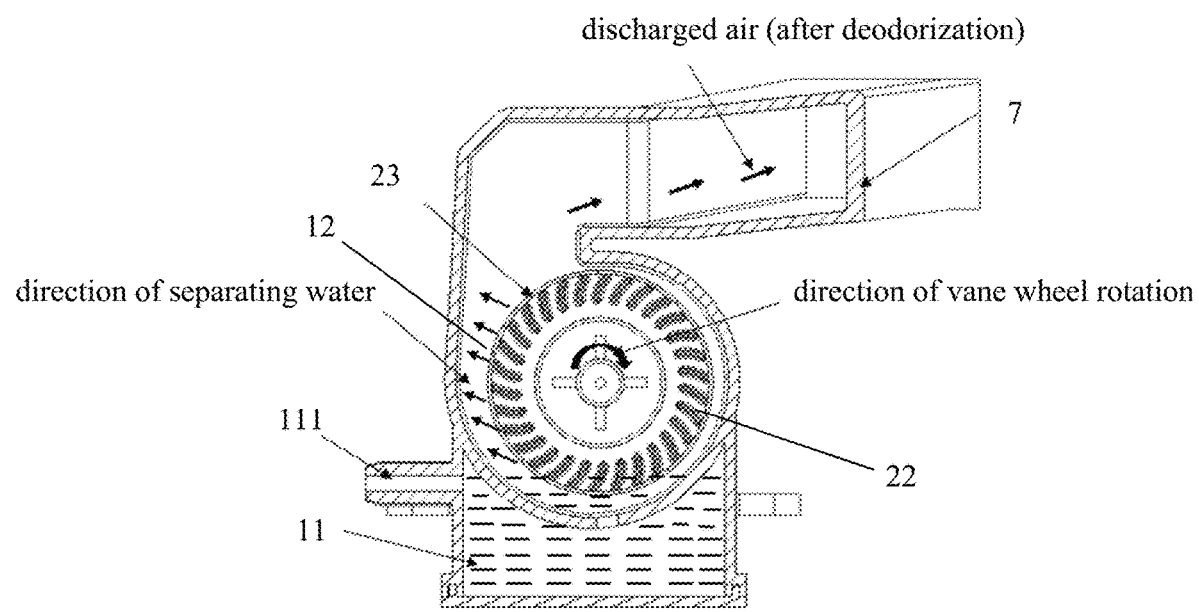
FIG. 5 is a longitudinal sectional view perpendicular to the axial direction of the deodorizing device in the first embodiment of the first example according to the present disclosure.

As shown in FIGS. 1-5, they are schematic diagrams of the structure of the deodorizing device in the first embodiment of the present disclosure. Specifically, FIG. 1 is a perspective view of the deodorizing device in the first embodiment of the first example according to the present disclosure; FIG. 2 is an exploded view of the deodorizing device in the first embodiment of the first example according to the present disclosure; FIG. 3 is a perspective view of an air inlet pipe of the deodorizing device in the first embodiment of the first example according to the present disclosure; FIG. 4 is a longitudinal sectional view along the axial direction of the deodorizing device in the first embodiment of the first example according to the present disclosure; FIG. 5 is a longitudinal sectional view perpendicular to the axial direction of the deodorizing device in the first embodiment of the first example according to the present disclosure.

The deodorizing device comprises a housing 1, as well as an air suction assembly 2, a water storage chamber 11 and a mixing chamber 12 respectively arranged in the housing 1. The mixing chamber 12 is located between the air suction assembly 2 and the housing 1. The air suction assembly 2 is used for sucking odor, the odor and water vapor are mixed and deodorized in the mixing chamber 12; the clean air after deodorization is discharged from the housing 1.

Specifically, as shown in FIGS. 1-2, the front side of the housing 1 includes an air inlet 13, which is connected to the air inlet pipe 6. The upper part of the housing 1 is connected to the air outlet pipe 7, and the rear side of the housing 1 is equipped with a drive motor 21 of the air suction assembly 2. The bottom surface of the housing 1 is sealed by a bottom plate 14, and the water storage chamber 11 (see FIG. 4) is formed in the chamber between the bottom plate 14 and the lower edge of the air inlet 13.

As shown in FIG. 2, the air suction assembly 2 also includes a vane wheel 22 and a fine screen 23. The drive motor 21 is used to drive the vane wheel 22 to rotate. The fine screen 23 is arranged on the outer periphery of the vane wheel 22. The vane wheel 22 and the fine screen 23 are both mounted inside the housing 1.

The vane wheel 22 has a cylindrical structure formed by a plurality of blades arranged at intervals around the center of the circle, and the fine screen 23 has a plurality of micro holes.

In the first embodiment, the vane wheel 22 is used to suck external odor into the mixing chamber 12 when rotating, and the odor is sucked into the mixing chamber 12 through the air inlet pipe 6 and the air inlet 13 (see FIG. 5).

Since a certain amount of water is stored in the water storage chamber 11, a certain amount of water mist or water vapor is formed in the mixing chamber 12. When the odor enters into the mixing chamber 12, the odor and water vapor are mixed and deodorized in the mixing chamber 12. The clean air after deodorization is discharged from the air outlet pipe 7. Since the main substances in the odor (ammonia, hydrogen sulfide, etc.) can be dissolved in water, and may react with each other after being dissolved in water, the odor is decomposed and filtered, and the clean air after removing the odor is discharged to the outside of the deodorizing device from the air outlet pipe 7 in the upper part to achieve the deodorization process.

In a modification of the first embodiment, the vane wheel 22 can be arranged closer to the air inlet 13; the fine screen 23 is located behind the vane wheel 22, the vane wheel 22 blows the odor to the fine screen 23 and the fine screen 23 can disperse the odor by means of the micro holes of the fine screen 23 so that the water can be mixed with it more thoroughly. In an embodiment, the vane wheel 22 can also be replaced with fan blades of a fan. The fan blades are arranged on the front side of the fine screen 23 and closer to the air inlet 13, and the fan blades blow the odor to the fine screen 23.

In an embodiment, the vane wheel 22 can also be located at the rear side of the fine screen 23 to suck the odor into the fine screen 23.

Further, as shown in FIGS. 4-5, the vane wheel 22 and the fine screen 23 partially enter into the water storage chamber 11.

During the rotation of the vane wheel 22, the water stored in the water storage chamber 11 is agitated. The odor penetrates through the fine screen 23 and mixes with the water vapor in the mixing chamber 12 to filter and dissolve the main substances in the odor. After being filtered and cleaned, the deodorized air is discharged from the air outlet pipe 7 in the upper part of the mixing chamber 12. The fine screen 23 can disperse the odor passing between the blades of the vane wheel 22 through the fine holes of the fine screen 23 so that the water can be mixed with the odor more thoroughly. The water droplets attached to the vane wheel 22 are separated from the air under the action of the centrifugal force generated by the rotation of the vane wheel 22. The separated water droplets are thrown to the inner side wall of the housing 1 and slide down to the water storage chamber 11 at the bottom, and then recirculate to be stirred by the vane wheel 22 to complete the deodorizing process.

Furthermore, as shown in FIGS. 3-4, a water retaining plate 3 is provided at the lower part of the air inlet 13. The water retaining plate 3 is located at the lower part of the connection between the air inlet pipe 6 and the air inlet 13. In this embodiment, the water retaining plate 3 can be directly connected to the air inlet pipe 6. In an embodiment, the water retaining plate 3 can also be directly connected to the housing 1.

Because the water retaining plate 3 has a certain height, a certain amount of water thus can be stored at the bottom of the mixing chamber 12. The mixing chamber 12 is in communication with the water storage chamber 11, which increases the water storage capacity, and the vane wheel 22 and the fine screen 23 are able to be partially immersed below the water level L. On the other hand, the water retaining plate 3 can prevent water from splashing out of the air inlet pipe 6 when the vane wheel 22 agitates the water.

In an embodiment, the air suction assembly 2 can also be replaced with something similar to the fan blades of a fan, any fine screen is not provided, and the fan blades may not be immersed in water. The water in the water storage chamber 11 is naturally volatilized and water vapor with high humidity is formed in the mixing chamber 12. The air suction assembly 2 sucks the external odor into the mixing chamber 12, the odor and the water vapor are fully mixed by the agitation of the fan blades, and the purified clean air is discharged from the air outlet pipe 7 in the upper part.

Further, as shown in FIG. 5, the air outlet pipe 7 is arranged obliquely to extend upward from the mixing chamber 12, and a filter screen not shown is provided at the rear end of the air outlet pipe 7.

When the deodorized air is discharged from the air outlet pipe 7, because the rapidly passing air may also bring a small amount of residual fine water mist and water droplets into the air outlet pipe 7, when the fine water mist and water droplets adhere to the air outlet pipe 7 and then big water droplets are formed on the inner side wall of the air outlet pipe 7, they can flow back into the mixing chamber 12 along the inclined pipe wall, and finally flow back into the water storage chamber 11. This prevents the water mist and fine water droplets from being discharged with the airflow and accumulating near the deodorizing exhaust window of the product. A filter screen can be installed in the rear end of the air outlet pipe 7 to block the fine water droplets that may be discharged with the airflow.

In the first embodiment, the odor is sucked from the air inlet pipe 6 and enters into the mixing chamber 12 through the air inlet 13. In the mixing chamber 12, the odor and water vapor are fully mixed. Since the main substances in the odor (ammonia, hydrogen sulfide, etc.) can be dissolved in water, the odor is separated from the water vapor in the upper part of the mixing chamber 12, and the clean air is discharged from the air outlet pipe 7 in the upper part to complete the deodorization process of the odor.

In this embodiment, since the high-speed rotation of the vane wheel 22 agitates the water or water mist during the deodorization process, when the deodorization function is turned on for a long time, fine water droplets may be discharged together with the airflow, and the water stored in the water storage chamber 11 will decrease with the extension of the deodorization time, thereby reducing the full mixing degree of the odor and the water, and then affecting the deodorization effect. Therefore, the control can also be set within a certain time range to replenish water periodically and quantitatively to the water storage chamber 11 to maintain stable deodorization efficiency. When the deodorization is over, the water mixed with the main substances of the odor is stored in the water storage chamber 11. At this time, the product will turn on the water inflow again and water enters through the water inlet 111 on the side of the water storage chamber 11 to discharge the water mixed with the main substances of the odor to achieve a cleaning effect.

In this embodiment, since the odor and water vapor can be fully mixed, the efficiency of deodorization is high; and the replacement cost of water is low, which can reduce the use cost of deodorization.

Figure 6:
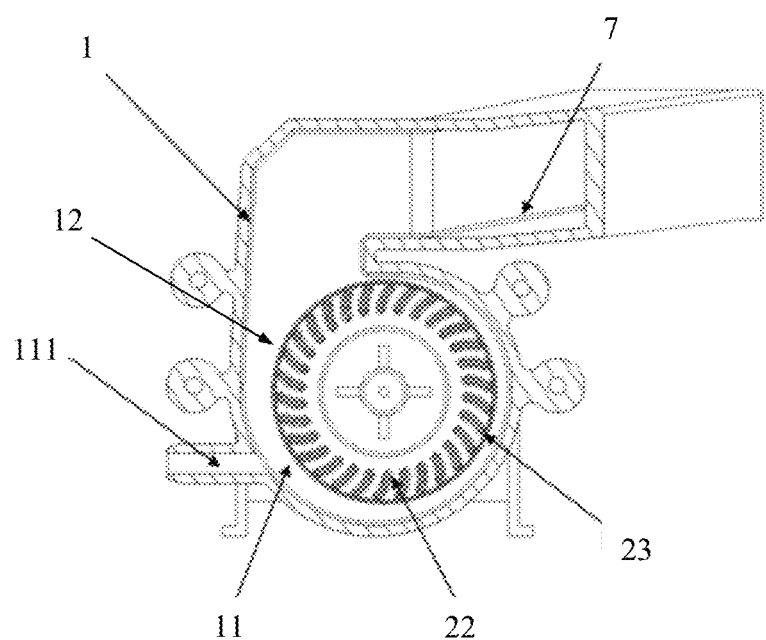
FIG. 6 is a longitudinal sectional view perpendicular to the axial direction of the deodorizing device in a modification of the first embodiment of the first example according to the present disclosure.
Figure 7:
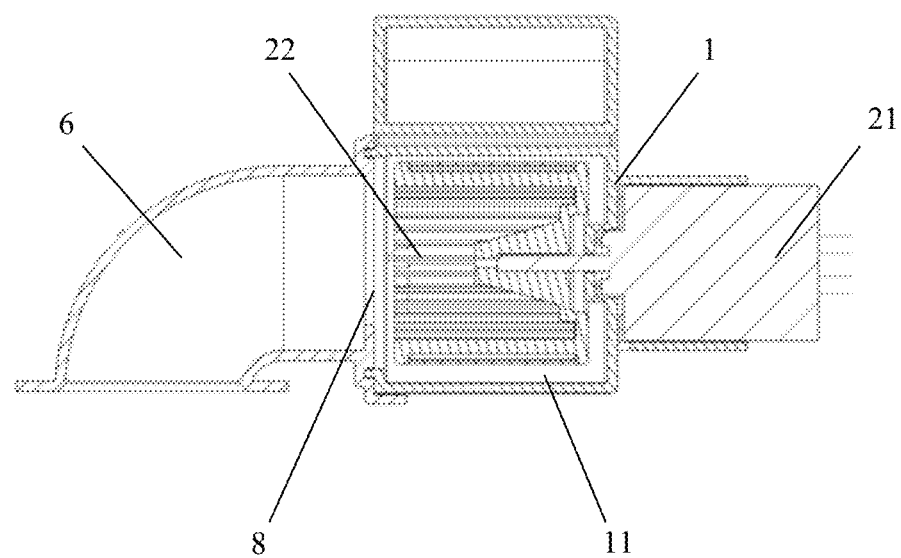
FIG. 7 is a longitudinal sectional view along the axial direction of the deodorizing device in a modification of the first embodiment of the first example according to the present disclosure.

As shown in FIGS. 6-7, it is a modification of the first embodiment. The rectangular housing and the bottom plate 14 forming the water storage chamber 11 in the first embodiment are omitted. The housing 1 only forms a circular cylindrical chamber outside the vane wheel 22. Specifically, FIG. 6 is a longitudinal sectional view perpendicular to the axial direction of the deodorizing device in a modification of the first embodiment of the first example according to the present disclosure; FIG. 7 is a longitudinal sectional view along the axial direction of the deodorizing device in a modification of the first embodiment of the first example according to the present disclosure.

Since the rear end of the air inlet pipe 6 and the front end of the mixing chamber 12 have a sealing structure 8, the sealing structure 8 can be a waterproof membrane which can prevent the water stored at the bottom of the mixing chamber 12 from leaking out of the deodorizing device. Therefore, when the deodorizing device feeds water, the water can be directly fed into the mixing chamber 12 through the water inlet 111 at the bottom of the housing 1 of the deodorizing device. Thus the lower rectangular housing and the bottom plate 14 can be eliminated, the structure design is simplified and the overall height of the deodorizing device is reduced. In the modification, the bottom of the mixing chamber 12 is equivalent to the water storage chamber 11, and a part of the vane wheel 22 and the fine screen 23 will be immersed in the water storage chamber 11.

Second Embodiment of the First Example

Figure 8:
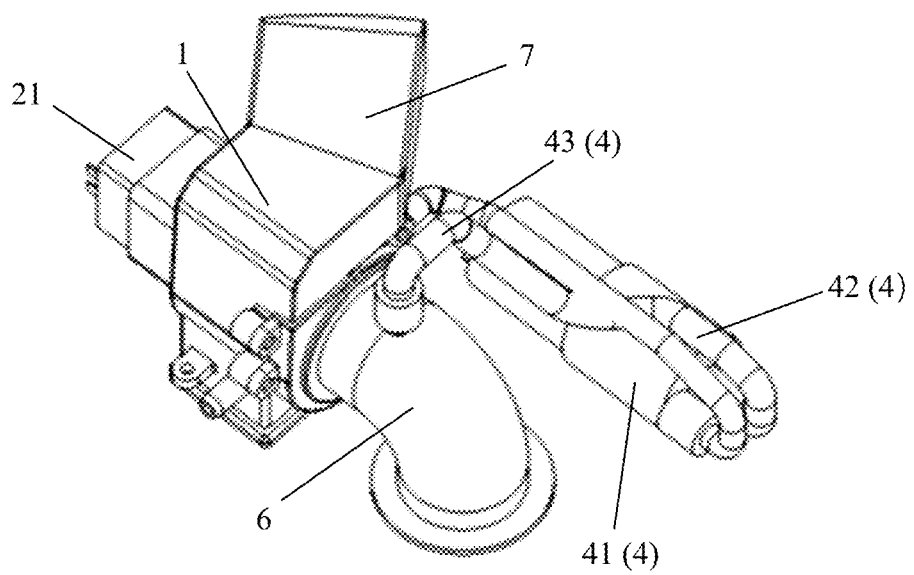
FIG. 8 is a perspective view of the deodorizing device in a second embodiment of the first example according to the present disclosure.
Figure 9:
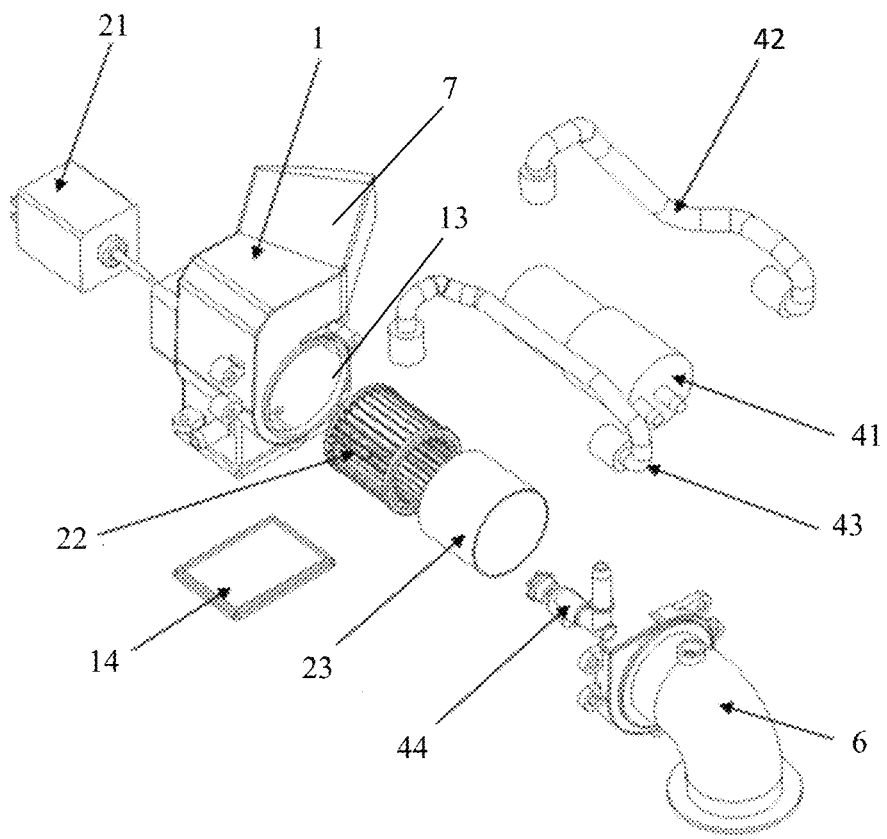
FIG. 9 is an exploded view of the deodorizing device in a second embodiment of the first example according to the present disclosure.
Figure 10:
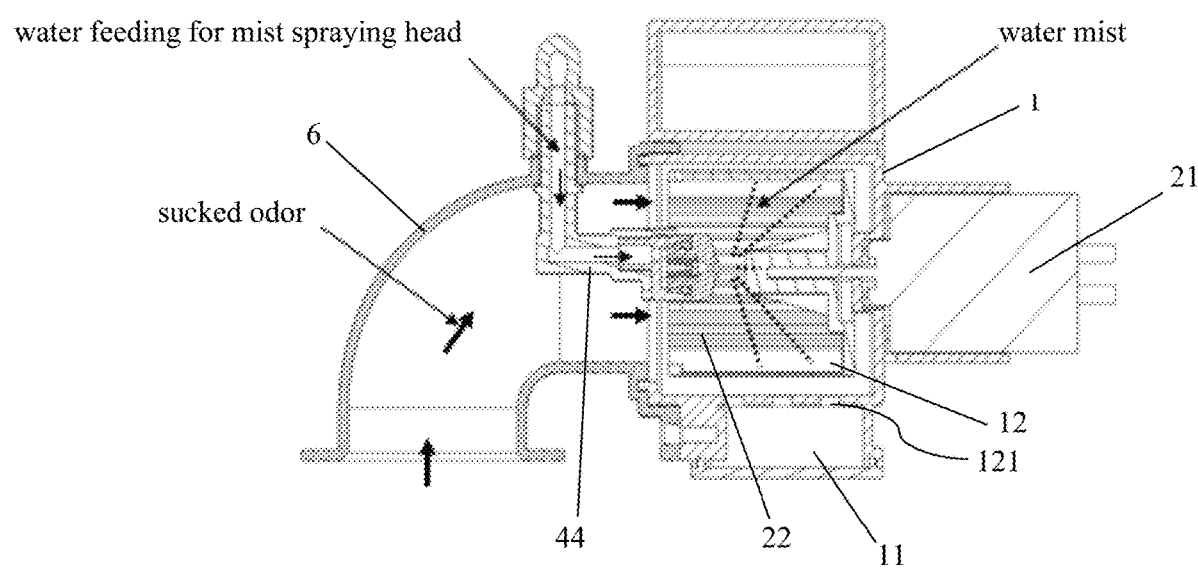
FIG. 10 is a longitudinal sectional view along the axial direction of the deodorizing device in the second embodiment of the first example according to the present disclosure.
Figure 11:
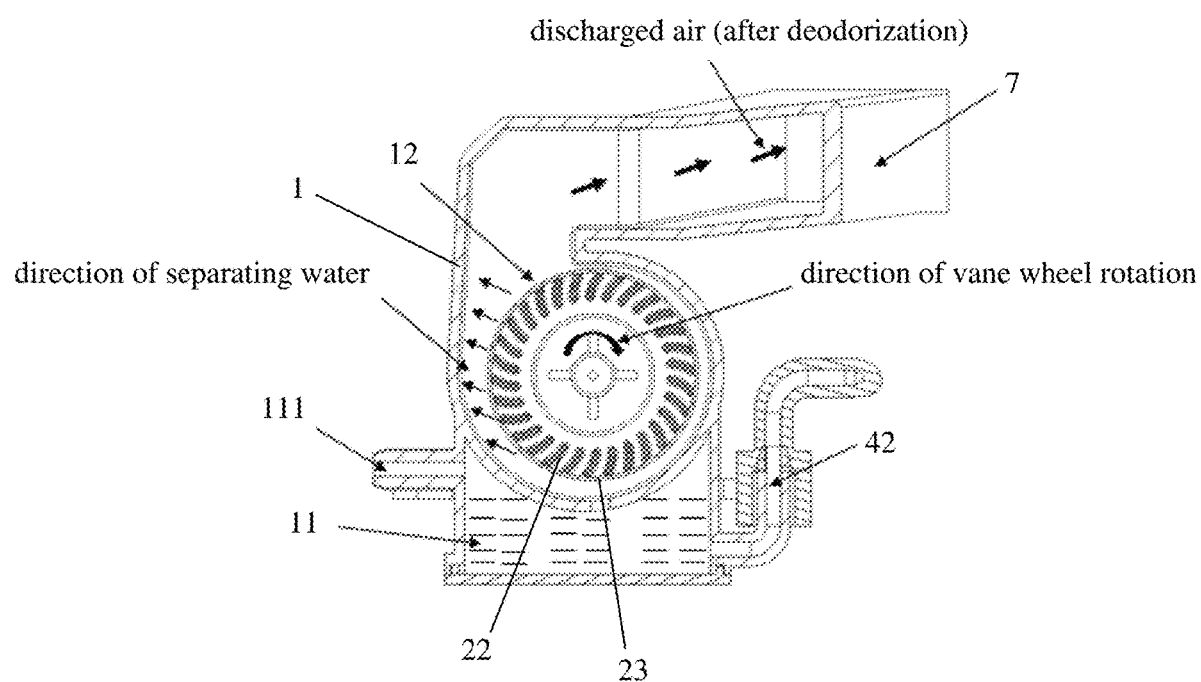
FIG. 11 is a longitudinal sectional view perpendicular to the axial direction of the deodorizing device in the second embodiment of the first example according to the present disclosure.

As shown in FIGS. 8-11, the difference from the first embodiment is: the deodorizing device may also include a mist spraying assembly 4 which sucks water from the water storage chamber 11 and sprays water mist toward the air suction assembly 2. The vane wheel 22 and the fine screen 23 are not immersed in water, but the water mist is sprayed toward the vane wheel 22 and the fine screen 23 through the mist spraying assembly 4. Specifically, FIG. 8 is a perspective view of the deodorizing device in a second embodiment of the first example according to the present disclosure; FIG. 9 is an exploded view of the deodorizing device in a second embodiment of the first example according to the present disclosure; FIG. 10 is a longitudinal sectional view along the axial direction of the deodorizing device in the second embodiment of the first example according to the present disclosure; FIG. 11 is a longitudinal sectional view perpendicular to the axial direction of the deodorizing device in the second embodiment of the first example according to the present disclosure.

Specifically, the mist spraying assembly 4 includes a water pump 41, a water pump water inlet pipe 42, a water pump water outlet pipe 43, and a mist spraying head 44. The water pump water inlet pipe 42 is connected to the water storage chamber 11 and the water pump 41, and the water pump water outlet pipe 43 is connected to the water pump 41 and the mist spraying head 44 which is located inside the vane wheel 22. The mist spraying head 44 enters the housing 1 from the air inlet pipe 6 and then extends to the center of the vane wheel 22, and can spray water mist radioactively toward the blades of the vane wheel 22.

As shown in FIG. 10, when deodorizing, when the odor sucked in from the air inlet pipe 6 passes through the blade gaps of the vane wheel 22, it must first penetrate through the fine screen 23 outside the vane wheel 22. The main function of the fine screen 23 is to disperse the odor sucked in as much as possible through micro holes, so that the air and the water mist as well as water in the mixing chamber 12 are fully mixed through the high-speed rotation of the vane wheel 22, and the main substances in the odor are filtered and dissolved. The deodorized air after filtering and cleaning is discharged from the air outlet pipe 7 on the upper part of the mixing chamber 12. The water droplets attached to the vane wheel 22 are separated from the air under the action of the centrifugal force generated by the rotation of the vane wheel 22, and the separated water droplets are thrown to the inner side wall of the mixing chamber 12 and then slide down to the water storage chamber 11 so that the water pump 41 can suck in again and spray into the mixing chamber 12 in a cyclic manner to complete the deodorization process.

Wherein, as shown in FIG. 10, the mixing chamber 12 and the water storage chamber 11 are isolated, and a plurality of small holes 121 are opened at the bottom of the mixing chamber 12. Therefore, when the deodorizing device feeds water, the water can enter the bottom of the mixing chamber 12 from the water storage chamber 11 through the small holes 121; and when the deodorizing device is working, the water in the mixing chamber 12 can flow back into the water storage chamber 11 through the small holes 121.

In a modification of the second embodiment, a dedicated water pump water chamber can be provided for supplying water to the water pump 41. The water pump water inlet pipe 42 is connected to the water pump water chamber and the water pump 41.

In an embodiment, the mist spraying head 44 is not necessarily located inside the vane wheel 22, but may also be located at the front side or rear side of the vane wheel 22, and can also spray water mist toward the inside of the vane wheel 22.

Third Embodiment of the First Example

Figure 12:
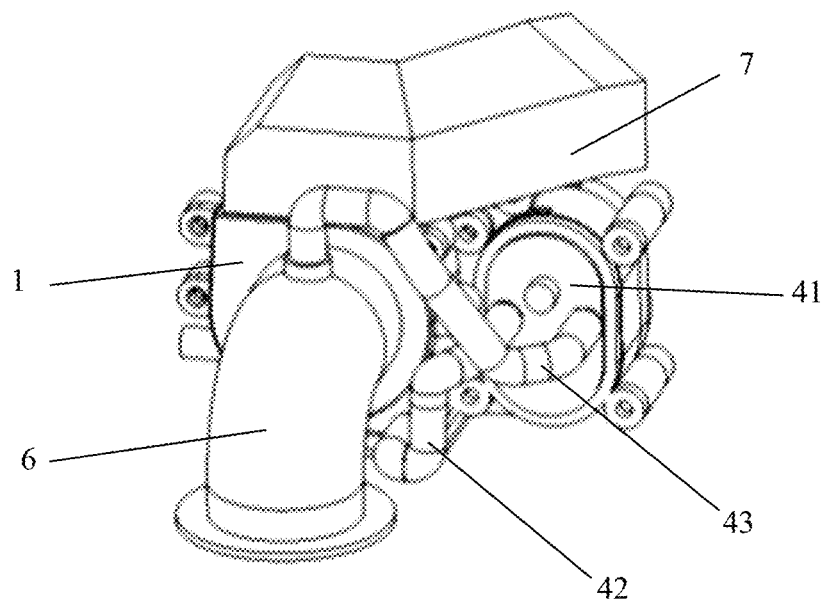
FIG. 12 is a perspective view of the deodorizing device in the third embodiment of the first example according to the present disclosure.
Figure 13:
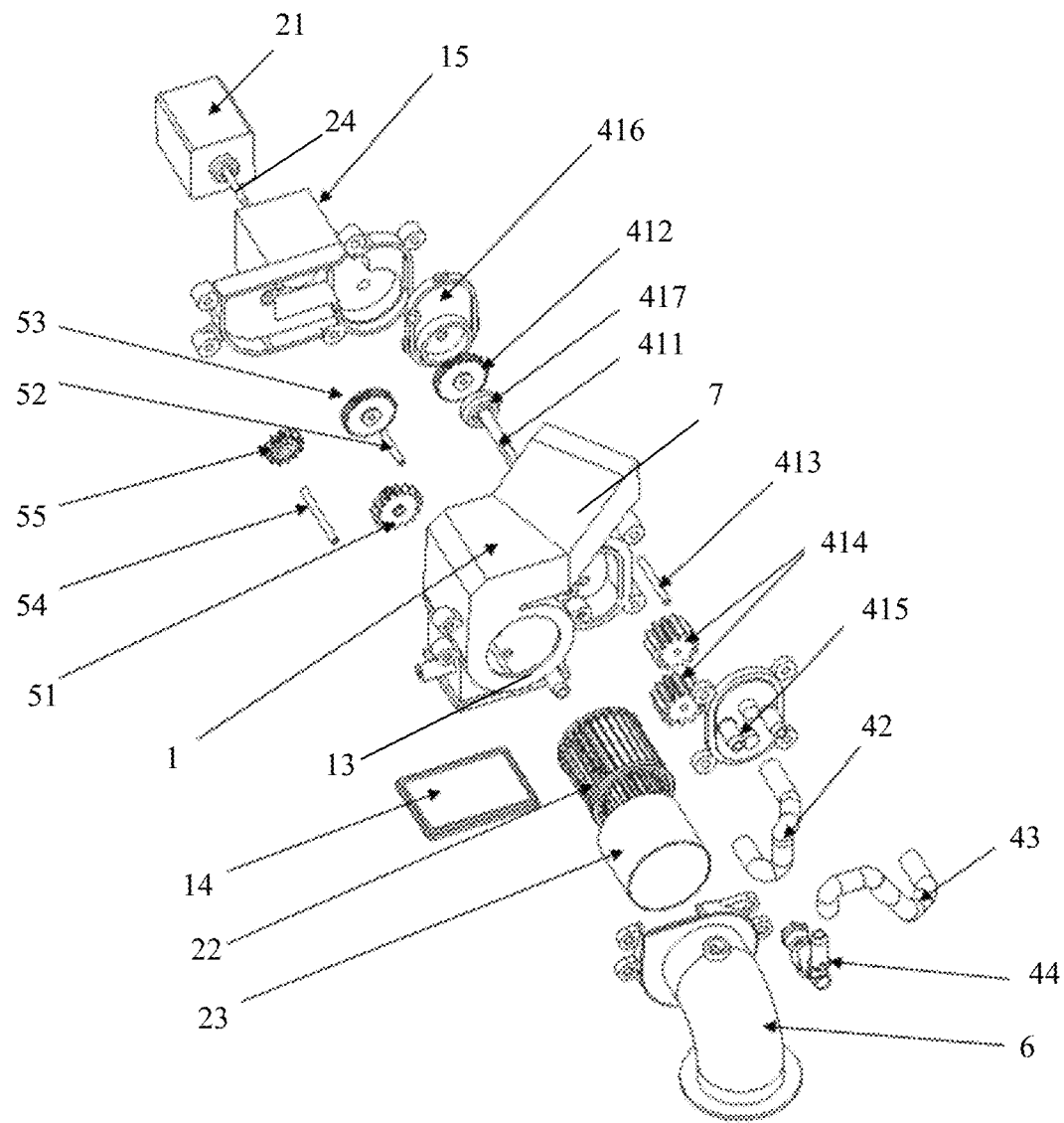
FIG. 13 is an exploded view of the deodorizing device in the third embodiment of the first example according to the present disclosure.
Figure 14:
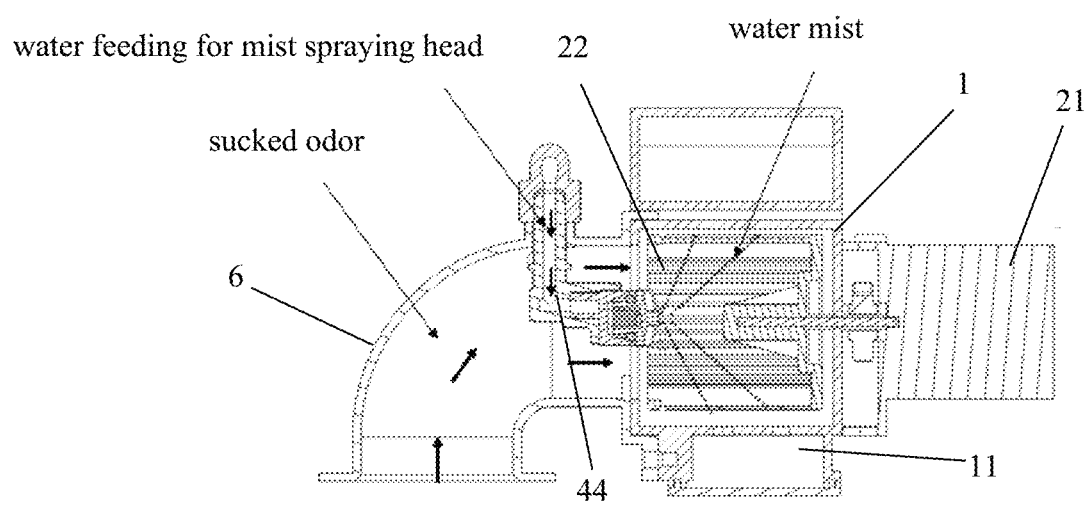
FIG. 14 is a longitudinal sectional view along the axial direction of the deodorizing device in the third embodiment of the first example according to the present disclosure.
Figure 15:
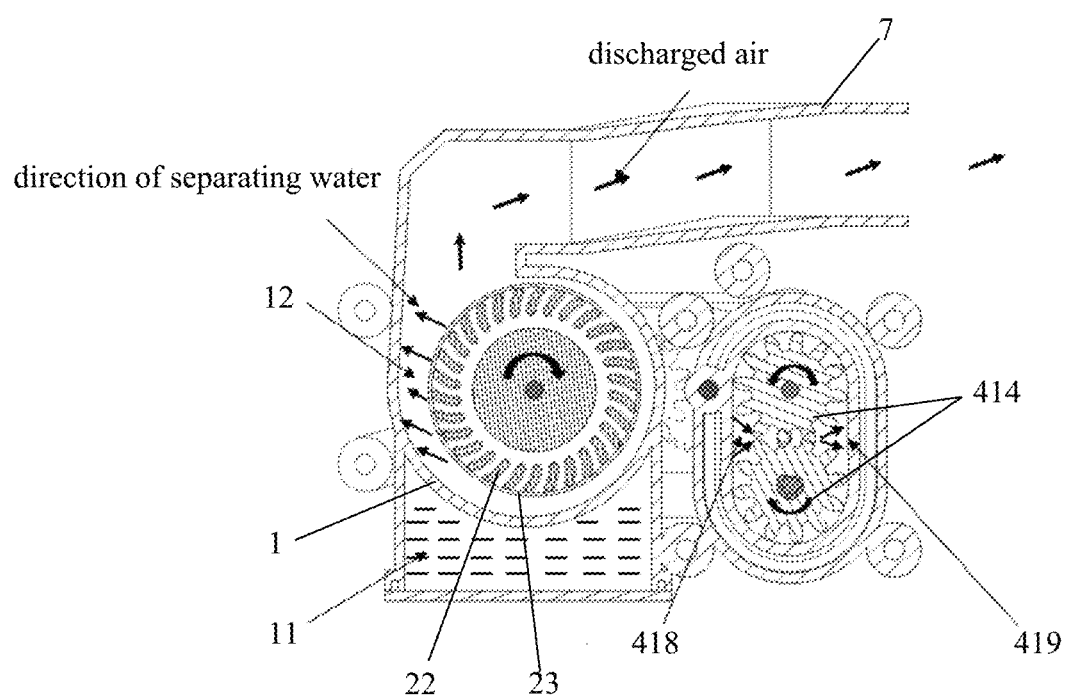
FIG. 15 is a longitudinal sectional view of the vane wheel perpendicular to the axial direction of the deodorizing device in the third embodiment of the first example according to the present disclosure.
Figure 16:
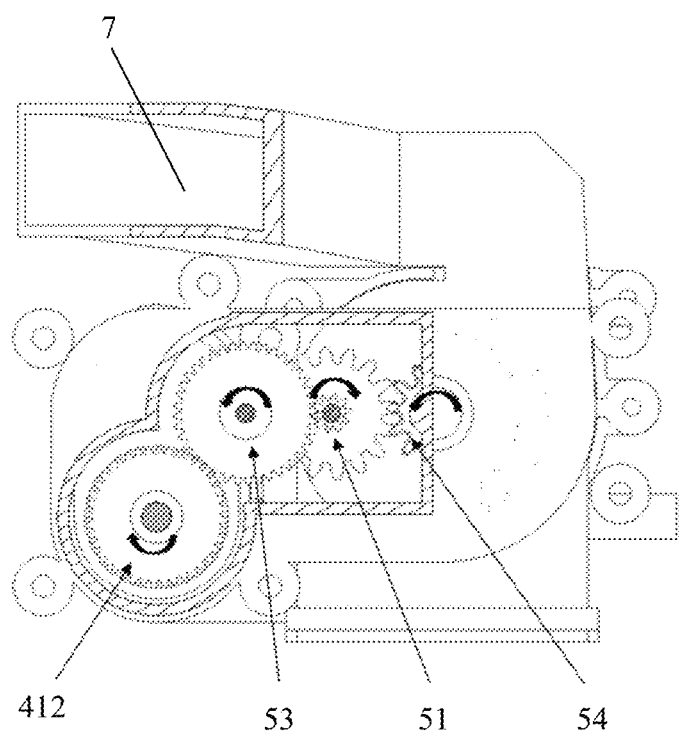
FIG. 16 is a longitudinal sectional view of the intermediate transmission gear perpendicular to the axial direction of the deodorizing device in the third embodiment of the first example according to the present disclosure.

As shown in FIGS. 12-16, the difference from the second embodiment is that the deodorizing device also includes a transmission assembly 5. The transmission assembly 5 includes a motor drive gear 51, an intermediate transmission shaft 52, an intermediate transmission gear 53, a vane wheel transmission gear 55, and a vane wheel transmission shaft 54. Specifically, FIG. 12 is a perspective view of the deodorizing device in the third embodiment of the first example according to the present disclosure; FIG. 13 is an exploded view of the deodorizing device in the third embodiment of the first example according to the present disclosure; FIG. 14 is a longitudinal sectional view along the axial direction of the deodorizing device in the third embodiment of the first example according to the present disclosure; FIG. 15 is a longitudinal sectional view of the vane wheel perpendicular to the axial direction of the deodorizing device in the third embodiment of the first example according to the present disclosure; FIG. 16 is a longitudinal sectional view of the intermediate transmission gear perpendicular to the axial direction of the deodorizing device in the third embodiment of the first example according to the present disclosure.

The motor drive gear 51 is mounted on the drive shaft 24 of the drive motor 21, the intermediate transmission gear 53 is mounted on the intermediate transmission shaft 52, the vane wheel transmission gear 55 is mounted on the vane wheel transmission shaft 54, and the motor drive gear 51 meshes with the intermediate transmission gear 53 and the vane wheel transmission gear 55, and the intermediate transmission gear 53 is used to drive the water pump 41 to rotate.

When the drive motor 21 rotates, it drives the drive shaft 24 to rotate. The drive shaft 24 drives the motor drive gear 51 to rotate, the motor drive gear 51 simultaneously drives the intermediate transmission gear 53 and the vane wheel transmission gear 55 to rotate, and the intermediate transmission gear 53 is used to drive the water pump 41 to rotate. The vane wheel transmission shaft 54 is used to drive the vane wheel 22 to rotate.

In this embodiment, by adding the corresponding drive and transmission gears and drive shafts, while the drive motor 21 drives the vane wheel 22 to rotate to suck the odor, the drive motor 21 also transmits the driving force to the water pump 41 through the intermediate transmission gear 53, and in the meanwhile the water pump 41 can also absorbs water from the water storage chamber 11 and sprays to the mixing chamber 12 through the mist spraying head 44. The integration of the water pump 41 and the deodorizing device is realized, and the internal space and cost of the product are saved.

Further, as shown in FIG. 13, the water pump 41 is a gear pump, and the gear pump includes a water pump lower transmission shaft 411, a water pump lower transmission gear 412, a water pump upper transmission shaft 413, and two water pump front gears 414. The intermediate transmission gear 53 meshes with the water pump lower transmission gear 412, the water pump lower transmission gear 412 is mounted on the water pump lower transmission shaft 411, and the water pump lower transmission shaft 411 drives the water pump upper transmission shaft 413 to rotate. One of the water pump front gears 414 is mounted on the water pump upper transmission shaft 413, and the two water pump front gears 414 mesh with each other.

When the intermediate transmission gear 53 drives the water pump lower transmission gear 412 to rotate, the water pump lower transmission gear 412 drives one of the water pump front gears 414 to rotate through the water pump lower transmission shaft 411 and the water pump upper transmission shaft 413. As shown in FIG. 15, the two water pump front gears 414 rotate in opposite directions to realize the water inlet and outlet of the gear pump.

The water pump 41 of the deodorizing device adopts the structure of a gear pump. When the drive motor 21 starts to work, on the one hand, the drive motor 21 drives the intermediate transmission gear 53 and the adjacent vane wheel transmission gear 55. The vane wheel transmission shaft 54 makes the vane wheel 22 rotate at a high speed to suck the odor. At the same time, through the intermediate transmission gear 53 and the intermediate transmission shaft 52, the matching water pump lower transmission gear 412 and the water pump lower transmission shaft 411 are drived to transmit power to the two water pump front gears 414 of the gear pump. Since the two water pump front gears 414 rotate in the opposite direction, the water can be sucked from the water storage chamber 11 through the water pump water inlet pipe 42 via the gear pump water suction chamber 418 on the left, and then pressurized and squeezed out from the gear pump water outlet chamber 419 on the right, and the mist spraying head 44 is supplied through the water pump water outlet pipe 43 to spray water mist into the mixing chamber 12. The water circulates between the water storage chamber 11 and the gear pump to complete the deodorizing function.

Fourth Embodiment of the First Example

Figure 17:
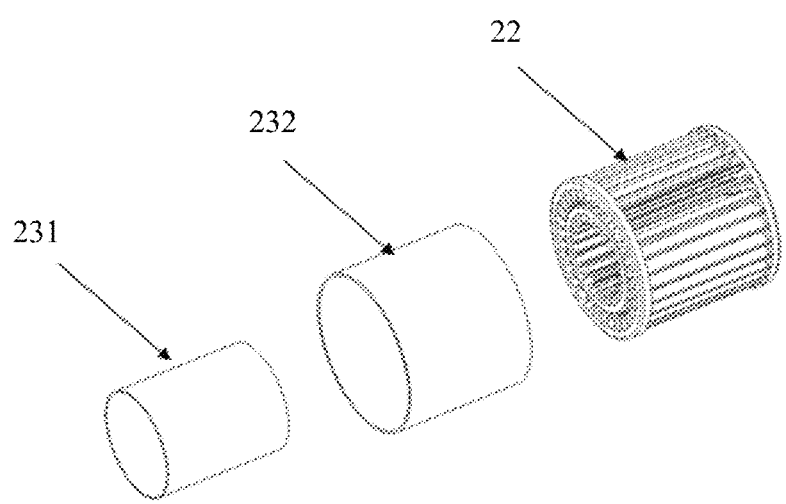
FIG. 17 is an exploded view of the vane wheel and screen of the deodorizing device in the fourth embodiment of the first example according to the present disclosure.
Figure 18:
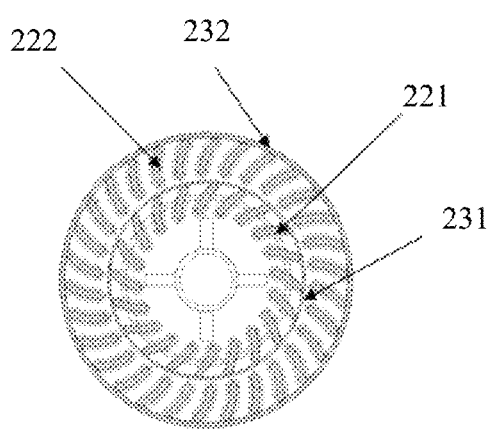
FIG. 18 is a longitudinal sectional view of the vane wheel and the screen of the deodorizing device in the fourth embodiment of the first example according to the present disclosure.
Figure 19:
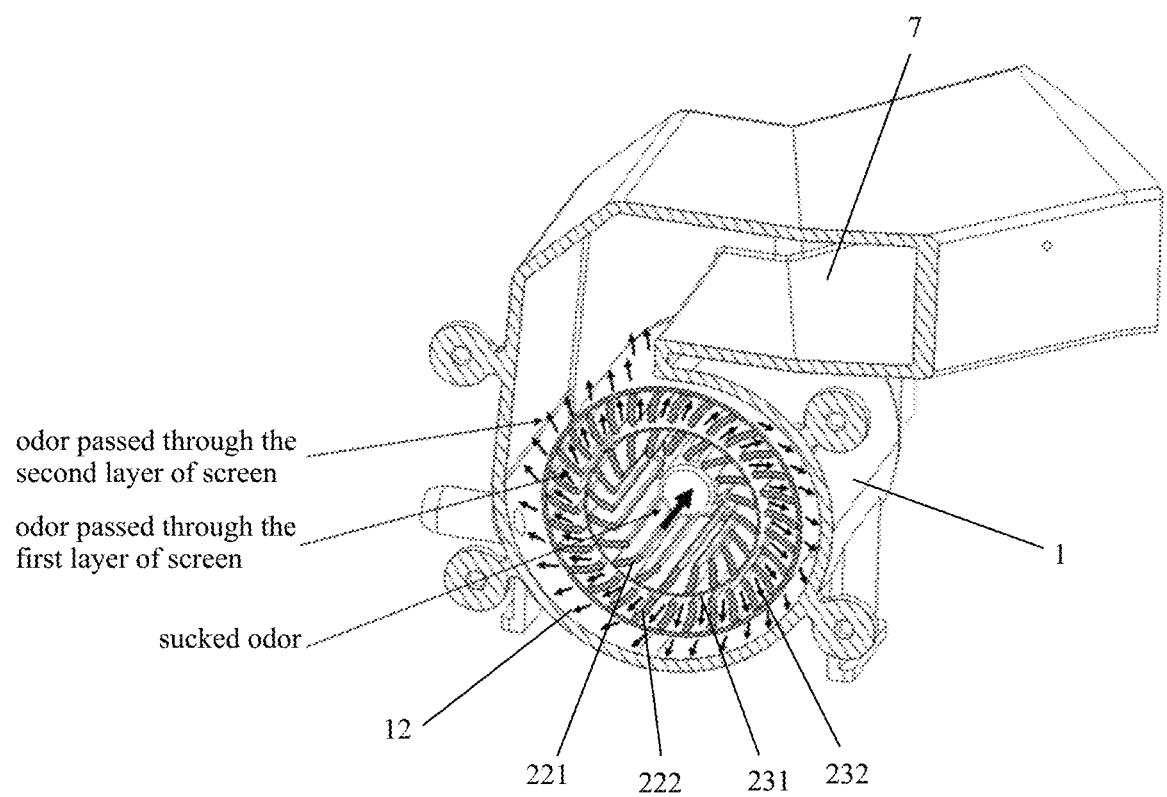
FIG. 19 is a sectional view of the vane wheel of the deodorizing device in the fourth embodiment of the first example according to the present disclosure.

As shown in FIGS. 17-19, the vane wheel 22 includes two layers of coaxially arranged vane groups with different diameters, and each layer of the vane group is covered with a ring of fine screens 23. Specifically, FIG. 17 is an exploded view of the vane wheel and screen of the deodorizing device in the fourth embodiment of the first example according to the present disclosure; FIG. 18 is a longitudinal sectional view of the vane wheel and the screen of the deodorizing device in the fourth embodiment of the first example according to the present disclosure; FIG. 19 is a sectional view of the vane wheel of the deodorizing device in the fourth embodiment of the first example according to the present disclosure.

Specifically, as shown in FIG. 17, the fine screen 23 includes an inner vane wheel screen 231 and an outer vane wheel screen 232. The diameter of the inner vane wheel screen 231 is smaller than the diameter of the outer vane wheel screen 232.

As shown in FIG. 18, the vane wheel 22 includes an inner vane wheel 221 and an outer vane wheel 222. The diameter of the inner vane wheel 221 is smaller than the diameter of the outer vane wheel 222. The inner vane wheel screen 231 is arranged outside the inner vane wheel 221, and the outer vane wheel screen 232 is arranged outside the outer vane wheel 222.

As shown in FIG. 19, in order to improve the efficiency of deodorization, the odor and water are more fully stirred and mixed in the mixing chamber 12 to achieve two-stage filtration. When the odor is sucked into the mixing chamber 12, most of the odor needs to pass through two layers of fine screens successively. The mixing chamber 12 is filled with water. When the vane wheel 22 rotates and agitates water at a high speed, a water curtain will be formed near the two layers of fine screens 23. The odor is then filtered twice in a row to improve the efficiency of deodorization.

In an embodiment, the vane wheel and the fine screen can also be made into three layers or more. Depending on the product space, the diameter of the vane wheel can also be increased, and multi-stage vanes with different diameters and corresponding screens are coaxially arranged on a vane wheel to achieve multi-stage filtration.

The air suction assembly in the fourth embodiment can be used to replace any one of the air suction assemblies in the deodorizing device in the first to third embodiments.

Fifth Embodiment of the First Example

Figure 20:
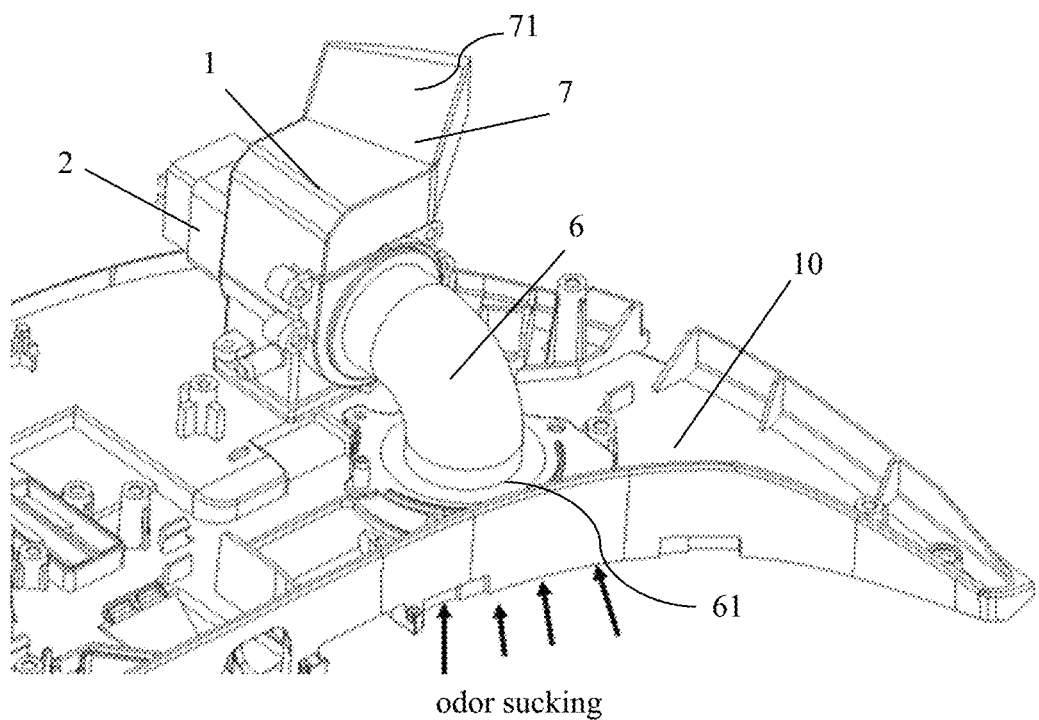
FIG. 20 is a schematic diagram of a partial internal structure of an intelligent toilet in the fifth embodiment of the first example according to the present disclosure.
Figure 21:
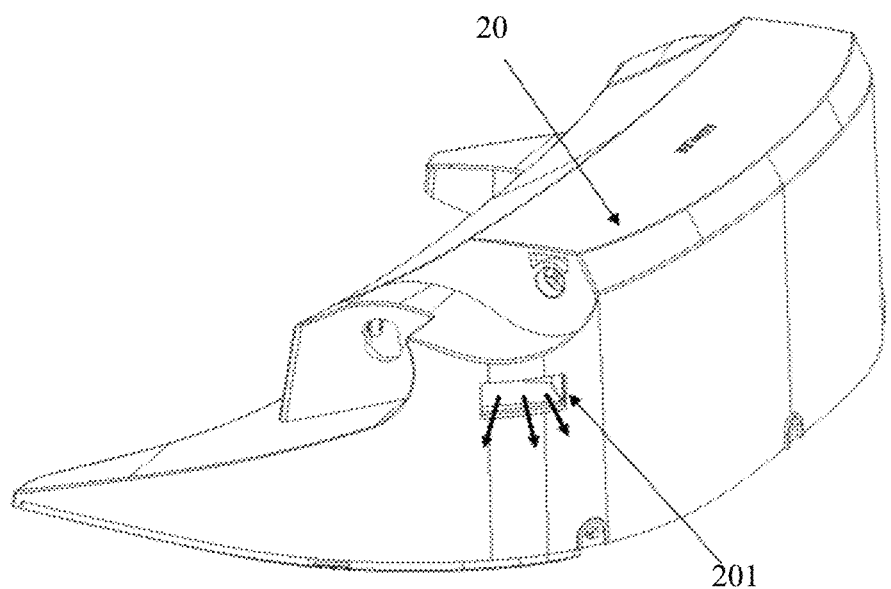
FIG. 21 is a partial perspective view of the intelligent toilet in the fifth embodiment of the first example according to the present disclosure.

As shown in FIGS. 20-21, the intelligent toilet includes a pedestal 10 and a machine cover 20, and also includes a deodorizing device which is arranged inside the pedestal 10 and the machine cover 20. Specifically, FIG. 20 is a schematic diagram of a partial internal structure of an intelligent toilet in the fifth embodiment of the first example according to the present disclosure; FIG. 21 is a partial perspective view of the intelligent toilet in the fifth embodiment of the first example according to the present disclosure.

Further, the air inlet end 61 of the air inlet pipe 6 is connected to the pedestal 10, and the air outlet end 71 of the air outlet pipe 7 protrudes from the side of the machine cover 20.

The odor is sucked into the air inlet pipe 6 from the air inlet end 61 extending to the pedestal 10, and then deodorized in the deodorizing device. After deodorization, the air is discharged from the air outlet end 71 of the air outlet pipe 7. The air outlet end 71 extends out from the side of the machine cover 20, and the purified air is discharged from the side to the outside of the intelligent toilet to complete the deodorization process.

In an embodiment, an electrolysis component can be added to electrolyze the water, and the electrolyzed hypochlorous acid water can be mixed with the odor to achieve a better deodorization effect.

The deodorizing device in this embodiment is the deodorizing device in the first embodiment, and any one of the deodorizing devices in the second to fourth embodiments or the modifications can also be selected.

In the present disclosure, the odor brought by the user when using the toilet is fully stirred and mixed with water for filtering, and the main substances (ammonia, hydrogen sulfide, etc.) in the odor are dissolved in the water or filtered by the water to deodorize. The present disclosure solves the problem that at present when the activated carbon oxidation module is used for deodorization, the odor passes through the deodorization module too quickly which causes the deodorization efficiency is not high. Moreover, present disclosure also solves the problem that at present after the user uses the deodorization module for a period of time, the deodorization efficiency will decrease and the module function may be of possible failure and need to replace the deodorization module regularly.

In addition, since the main substances in the odor are easily soluble in water or can be filtered by water to deodorize, compared with using activated carbon to remove the main substances in the odor by adsorption or by the attached oxides, the deodorization is more direct and efficient, which improves the efficiency of deodorization and saves the costs.

The described above are only the principles and preferred embodiments of the present disclosure. It should be pointed out that for those of ordinary skill in the art, based on the principles of the present disclosure, several other modifications can be made, which should also be regarded as falling into the protection scope of the present disclosure.

SECOND EXAMPLE

First Embodiment of the Second Example

Figure 22:
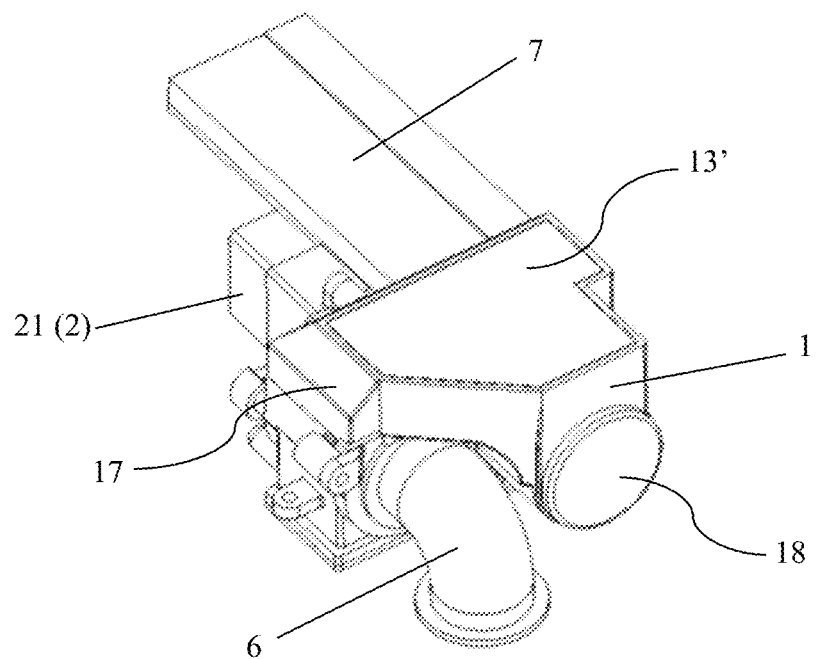
FIG. 22 is a perspective view of the deodorizing device in the first embodiment of a second example according to the present disclosure.
Figure 23:
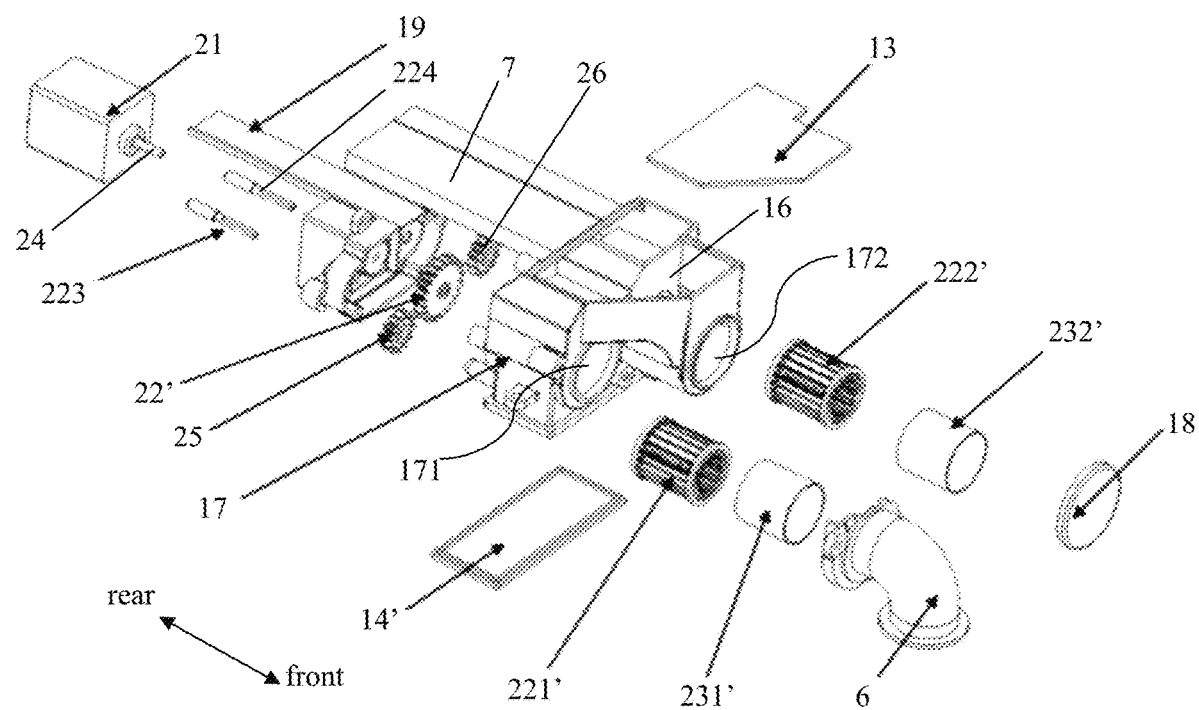
FIG. 23 is an exploded view of the deodorizing device in the first embodiment of the second example according to the present disclosure.
Figure 24:
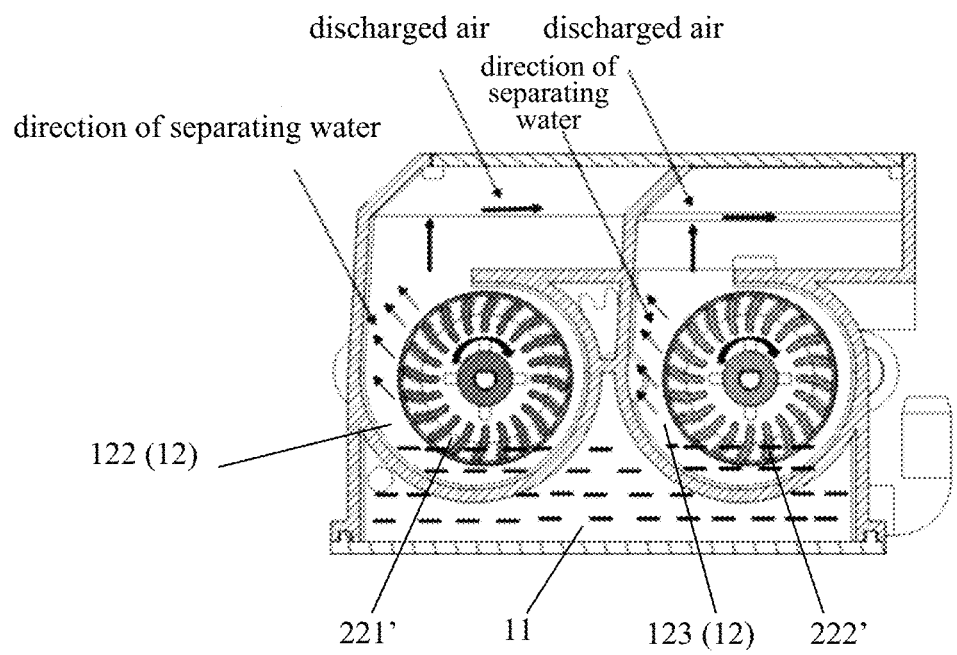
FIG. 24 is a longitudinal sectional view of the housing main body of the deodorizing device in the first embodiment of the second example according to the present disclosure.
Figure 25:
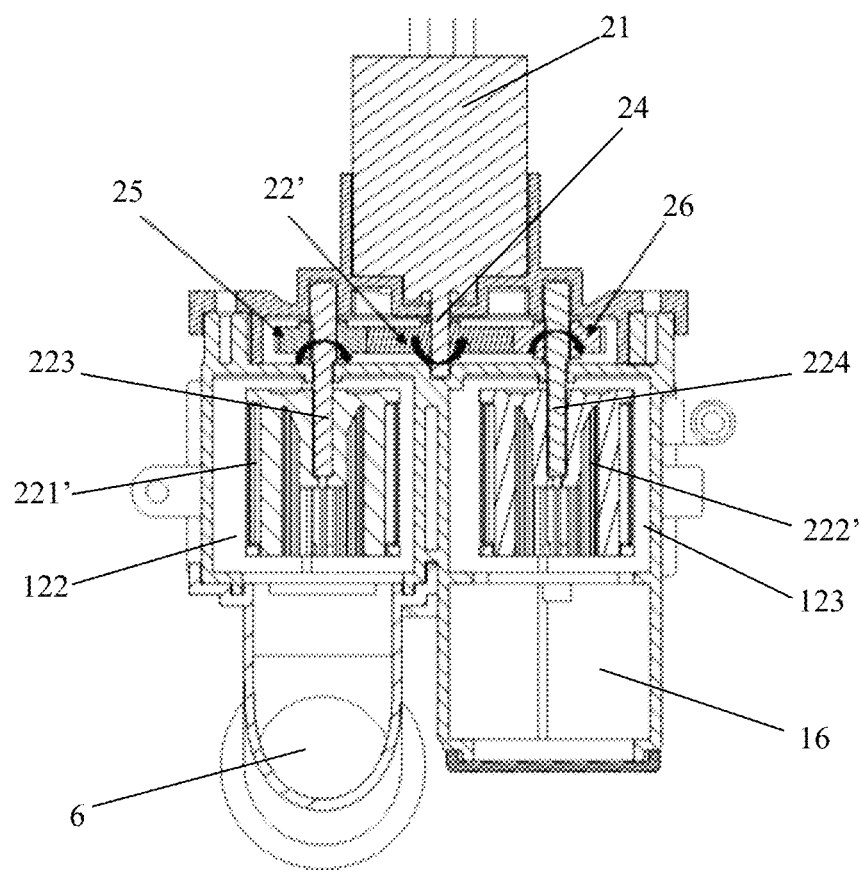
FIG. 25 is a lateral sectional view of the deodorizing device in the first embodiment of the second example according to the present disclosure.
Figure 26:
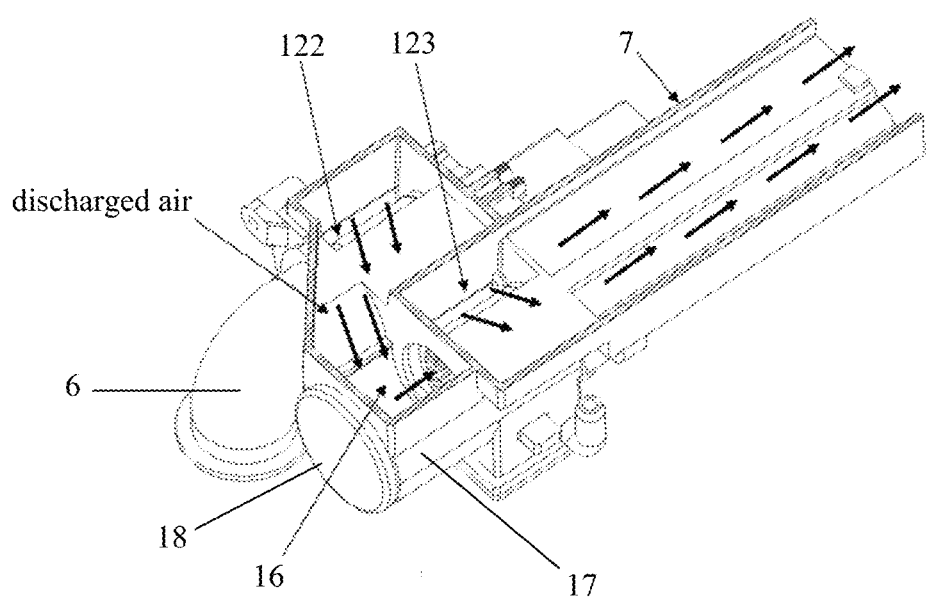
FIG. 26 is a perspective view of the deodorizing device in the first embodiment of the second example according to the present disclosure with a top cover omitted.
Figure 27:
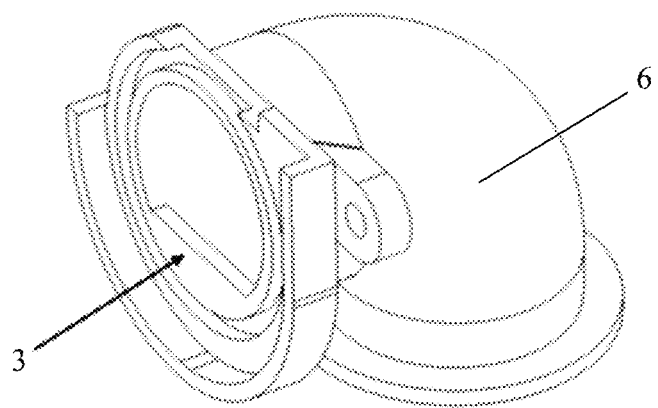
FIG. 27 is a perspective view of the air inlet pipe of the deodorizing device in the first embodiment of the second example according to the present disclosure.

As shown in FIGS. 22-27, they are schematic diagrams of the structure of the deodorizing device in the first embodiment of the present disclosure. Specifically, FIG. 22 is a perspective view of the deodorizing device in the first embodiment of the second example according to the present disclosure; FIG. 23 is an exploded view of the deodorizing device in the first embodiment of the second example according to the present disclosure; FIG. 24 is a longitudinal sectional view of the housing main body of the deodorizing device in the first embodiment of the second example according to the present disclosure; FIG. 25 is a lateral sectional view of the deodorizing device in the first embodiment of the second example according to the present disclosure; FIG. 26 is a perspective view of the deodorizing device in the first embodiment of the second example according to the present disclosure with a top cover omitted; FIG. 27 is a perspective view of the air inlet pipe of the deodorizing device in the first embodiment of the second example according to the present disclosure.

As shown in FIGS. 22-24, the deodorizing device comprises a housing 1, an air inlet pipe 6 and an air outlet pipe 7 respectively connected to the housing 1, an air suction assembly 2, a water storage chamber 11 and a mixing chamber 12 arranged in the housing 1. The mixing chamber 12 is located between the air suction assembly 2 and the housing 1. The air suction assembly 2 is used for sucking odor from the air inlet pipe 6. The odor and water vapor are mixed and deodorized in the mixing chamber 12. The clean air after deodorization is discharged from the air outlet pipe 7.

In the first embodiment, the air suction assembly 2 is used for sucking external odor into the mixing chamber 12 while rotating. Specifically, the odor is sucked into the mixing chamber 12 through the air inlet pipe 6.

Since a certain amount of water is stored in the water storage chamber 11, a certain amount of water mist or water vapor is formed in the mixing chamber 12. When the odor enters into the mixing chamber 12, the odor and water vapor are mixed and deodorized in the mixing chamber 12. The clean air after deodorization is discharged from the air outlet pipe 7. Since the main substances in the odor (ammonia, hydrogen sulfide, etc.) can be dissolved in water, and may react with each other after being dissolved in water, the odor is decomposed and filtered, and the clean air after removing the odor is discharged to the outside of the deodorizing device from the air outlet pipe 7 in the upper part to achieve the deodorization process.

Further, as shown in FIGS. 24 and 26, the mixing chamber 12 includes a first mixing chamber 122 and a second mixing chamber 123 that are connected to each other through a connecting channel 16. The air inlet pipe 6 is connected to the first mixing chamber 122 directly, and the air outlet pipe 7 is connected to the second mixing chamber 123 directly.

As shown in FIG. 26, the odor enters into the first mixing chamber 122 from the air inlet pipe 6. After deodorization through the first mixing chamber 122, the odor then enters into the second mixing chamber 123 through the connecting channel 16. In the second mixing chamber 123, the odor after a first-level filtration mixes with water mist or water vapor and is filtered again so that a continuous second-level deodorization is achieved. Finally, the air after filtration and deodorization is discharged outside through the air outlet pipe 7.

Further, as shown in FIG. 23, the air suction assembly 2 includes a drive motor 21, a drive shaft 24, an intermediate drive gear 22', a first vane wheel 221', a second vane wheel 222', a first fine screen 231', a second fine screen 232'. The drive motor 21 is used to drive the drive shaft 24 to rotate. The intermediate drive gear 22' is nested on the drive shaft 24 and drives the first vane wheel 221' and the second vane wheel 222' to rotate. The first fine screen 231' is arranged on the outer periphery of the first vane wheel 221', the second fine screen 232' is arranged on the outer periphery of the second vane wheel 222'. The first vane wheel 221' and the first fine screen 231' are located inside the first mixing chamber 122, the second vane wheel 222' and the second fine screen 232' are located inside the second mixing chamber 123.

In an embodiment, the first vane wheel 221' can be arranged at the front side of the first fine screen 231', near the position of the air inlet pipe 6. The second vane wheel 222' can be arranged at the front side of the second fine screen 232'.

The first vane wheel 221' blows the odor towards the first fine screen 231'. The first fine screen 231' can disperse the odor by means of the micro holes of the first fine screen 231' so that the water or water vapor can be mixed with it more thoroughly. The second vane wheel 222' blows the odor after the first-level filtration towards the second fine screen 232'. The second fine screen 232' can disperse the odor by means of the micro holes of the second fine screen 232' so that the water or water vapor can be mixed with it more thoroughly.

In an embodiment, the first vane wheel 221' and the second vane wheel 222' can also be replaced with fan blades of a fan. The fan blades are arranged on the front sides of the first fine screen 231' and the second fine screen 232', closer to the position of the air inlet pipe 6. The fan blades blow the odor to the first fine screen 231' and the second fine screen 232'.

In an embodiment, the first vane wheel 221' and the second vane wheel 222' can also be arranged at the rear side of the first fine screen 231' and the second fine screen 232' to suck the odor from the air inlet pipe 6 to the first fine screen 231' and the second fine screen 232'.

Further, as shown in FIG. 25, the air suction assembly 2 also includes a first side gear 25 and a second side gear 26. The intermediate drive gear 22' meshes with the first side gear 25 and the second side gear 26 respectively. The first side gear 25 drives the first vane wheel 221' through a first vane wheel drive shaft 223 to rotate, and the second side gear 26 drives the second vane wheel 222' through a second vane wheel drive shaft 224 to rotate.

When the drive motor 21 is turned on, the intermediate drive gear 22' can drive a first side gear 25 and a second side gear 26 to rotate simultaneously, so as to drive the first vane wheel 221' and the second vane wheel 222' to rotate simultaneously in the same direction. As the first mixing chamber 122 and the second mixing chamber 123 are connected through the connecting channel 16, which is equivalent to connecting two centrifugal fans in series, therefore in the environmental structure with small space and large wind resistance, the air pressure inside the pipes of the deodorizing device can be enhanced to improve the efficiency of odor suction.

Further, as shown in FIG. 24, the water storage chamber 11 is located below the first mixing chamber 122 and the second mixing chamber 123. The first vane wheel 221', the second vane wheel 222', the first fine screen 231' and the second fine screen 232' partly enter into the water storage chamber 11.

Before turning on the deodorization function, a certain volume of water is injected into the bottom of the water storage chamber 11 and the two water mixing chambers 12 through the water inlet (not shown) of the water storage chamber 11, and the bottom of the first vane wheel 221' and the second vane wheel 222' is submerged. When the deodorization function is turned on, the first vane wheel 221' and the second vane wheel 222' suck odor through the air inlet pipe 6 located at the front end by high-speed rotation, in the meanwhile the water stored at the bottom of the mixing chamber 11 is agitated. While the odor penetrates through the fine screen 23, it mixes with the water in the mixing chamber 12 so as to filter and dissolve the main substances in the odor. After being filtered and cleaned through the first mixing chamber 122, the first time deodorized air enters into the second mixing chamber 123 via a connecting channel 16 located at the upper part of the deodorizing device and is deodorized again by the agitation of the water using the second vane wheel 222'. The water droplets attached on the first vane wheel 221' and the second vane wheel 222' separate from the air under the action of centrifugal force generated by the rotation of the vane wheels. The separated water droplets are spined off to the inner side wall of the mixing chamber 12 and slide down to the bottom of the mixing chamber 12 and the water storage chamber 11, and then are used repeatedly to be agitated by the vane wheels to complete the deodorization. The deodorized air is discharged from an air outlet pipe 7 at the rear end after two-stage filtration.

Further, as shown in FIGS. 22-23, the housing 1 includes a housing main body 17, a front cover 18, a motor fixing rear plate 19, a top cover 13' and a water storage chamber bottom plate 14';

the housing main body 17 is provided with the first mixing chamber 122 and the second mixing chamber 123 inside, the front side of the housing main body 17 is provided with the air inlet 171 and a connecting channel opening 172;

the air inlet 171 is connected to the air inlet pipe 6, the front cover 18 is arranged to cover the connecting channel opening 172 for closing the front side of the connecting channel 16; the top part of the connecting channel 16 is sealed by the top cover 13', the second mixing chamber 123 is located at the rear side of the connecting channel 16 in the housing main body 17;

the motor fixing rear plate 19 is connected to the rear side of the housing main body 17, the drive motor 21 is mounted at the rear side of the motor fixing rear plate 19, the drive shaft 24 passes through the motor fixing rear plate 19 and enters into a transmission chamber 191 between the housing main body 17 and the motor fixing rear plate 19, the intermediate drive gear 22', the first side gear 25 and the second side gear 26 are arranged inside the transmission chamber 191; the transmission chamber 191 separates the drive motor 21 outside, and separates the intermediate drive gear 22', the first side gear 25 and the second side gear 26 outside of the mixing chamber 12 to prevent water or water vapor from impacting the drive parts;

the top cover 13' is connected to the top part of the housing main body 17 for sealing the upper parts of the first mixing chamber 122, the connecting channel 16 and the second mixing chamber 123;

the water storage chamber bottom plate 14' is connected to the bottom part of the housing main body 17, a water storage chamber 11 is formed therebetween.

Further, as shown in FIG. 27, the lower part of the connection between the air inlet pipe 6 and the air inlet 171 is provided with a water retaining plate 3. In the present embodiment, the water retaining plate 3 can be connected to the air inlet pipe 6 directly. In an embodiment, the water retaining plate 3 can also be connected to the air inlet 171 of the housing main body 17.

Since the water retaining plate 3 has a certain height, a certain amount of water thus can be stored at the bottom of the mixing chamber 12. The mixing chamber 12 is in communication with the water storage chamber 11, which increases the water storage capacity, and the vane wheels and the fine screens 23 are able to be partly immersed below the water level. Also, the water retaining plate 3 can prevent water from splashing out of the air inlet pipe 6 while the vane wheels agitate the water.

In an embodiment, the air suction assembly 2 can also be replaced with something similar to the fan blades of a fan, any fine screen is not provided, and the fan blades may not be immersed in water. The water in the water storage chamber 11 is naturally volatilized and water vapor with high humidity is formed in the mixing chamber 12. The air suction assembly 2 sucks the external odor into the mixing chamber 12, the odor and the water vapor are fully mixed by the agitation of the fan blades, and the purified clean air is discharged from the air outlet pipe 7 in the upper part.

In this embodiment, since the high-speed rotation of the vane wheels agitates the water or water mist during the deodorization process, when the deodorization function is turned on for a long time, fine water droplets may be discharged together with the airflow, and the water stored in the water storage chamber 11 will decrease with the extension of the deodorization time, thereby reducing the full mixing degree of the odor and the water, and then affecting the deodorization effect. Therefore, the control can also be set within a certain time range to replenish water periodically and quantitatively to the water storage chamber 11 to maintain stable deodorization efficiency. When the deodorization is over, the water mixed with the main substances of the odor is stored in the water storage chamber 11. At this time, the product will turn on the water inflow again and water enters through the water inlet on the side of the water storage chamber 11 to discharge the water mixed with the main substances of the odor to achieve a cleaning effect.

In the first embodiment, the odor is sucked from the air inlet pipe 6 and enters into the mixing chamber 12 through the air inlet 13. In the mixing chamber 12, the odor and water vapor are fully mixed. Since the main substances in the odor (ammonia, hydrogen sulfide, etc.) can be dissolved in water, the odor is separated from the water vapor in the upper part of the mixing chamber 12, and the clean air is discharged from the air outlet pipe 7 in the upper part to complete the deodorization process of the odor. Since the odor and water vapor can be fully mixed, the efficiency of deodorization is high; and the replacement cost of water is low, which can reduce the use cost of deodorization.

Second Embodiment of the Second Example

Figure 28:
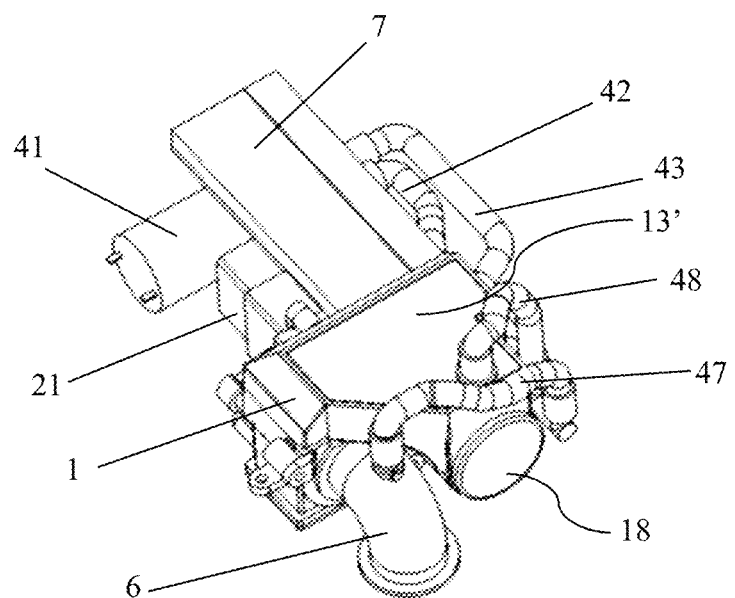
FIG. 28 is a perspective view of the deodorizing device in the second embodiment of the second example according to the present disclosure.
Figure 29:
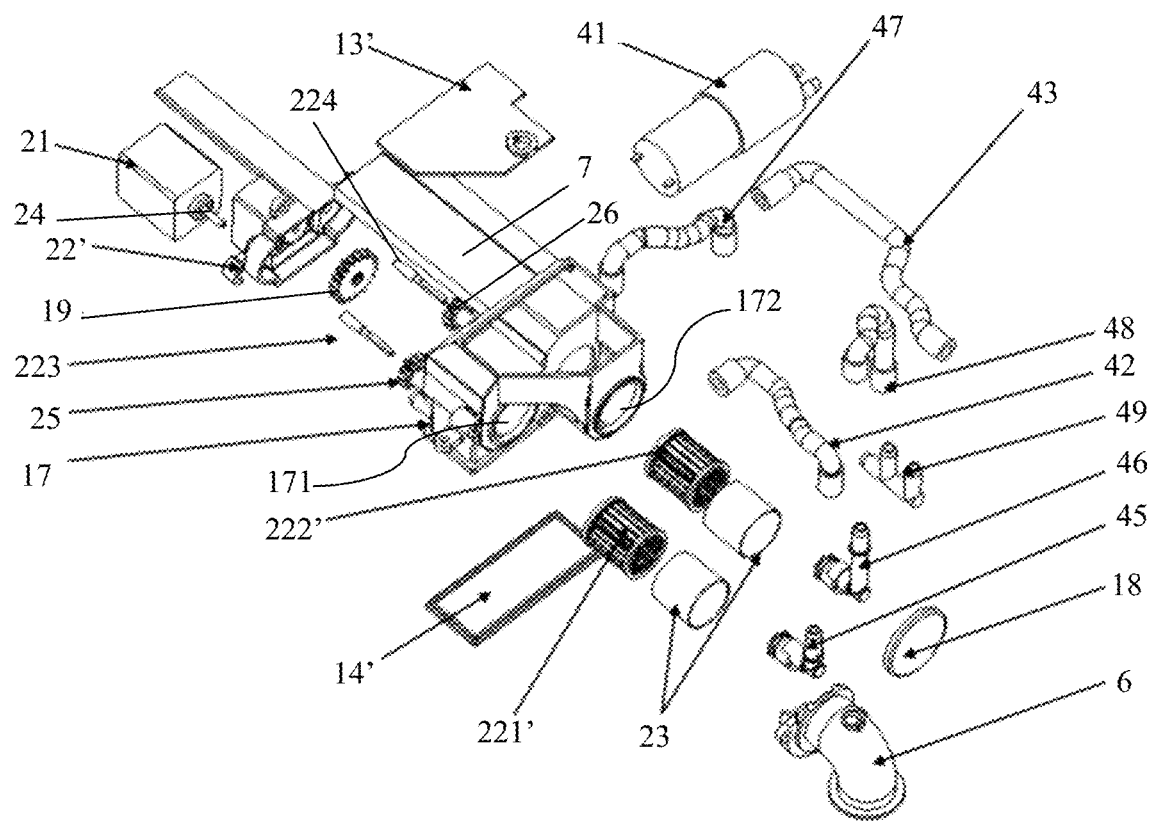
FIG. 29 is an exploded view of the deodorizing device in the second embodiment of the second example according to the present disclosure.
Figure 30:
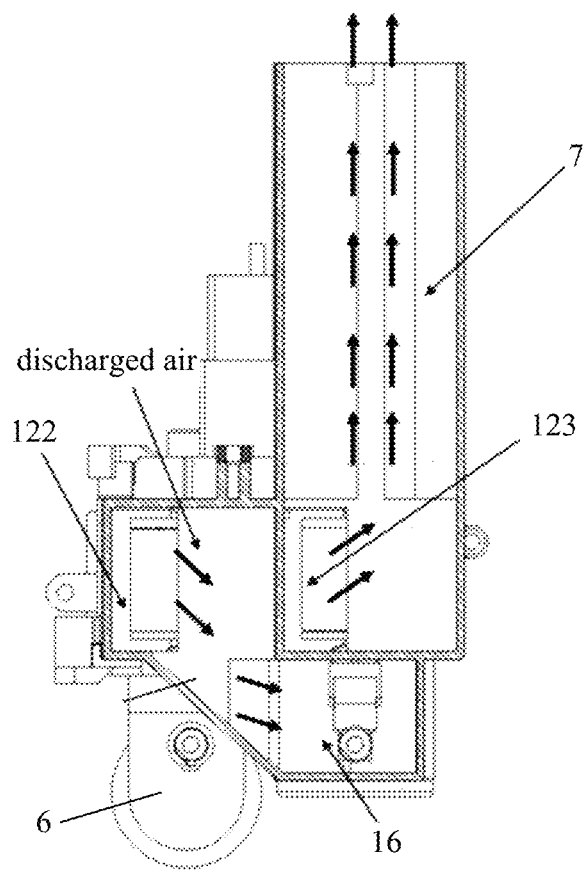
FIG. 30 is a top view of the deodorizing device in the second embodiment of the second example according to the present disclosure with a top cover omitted.
Figure 31:
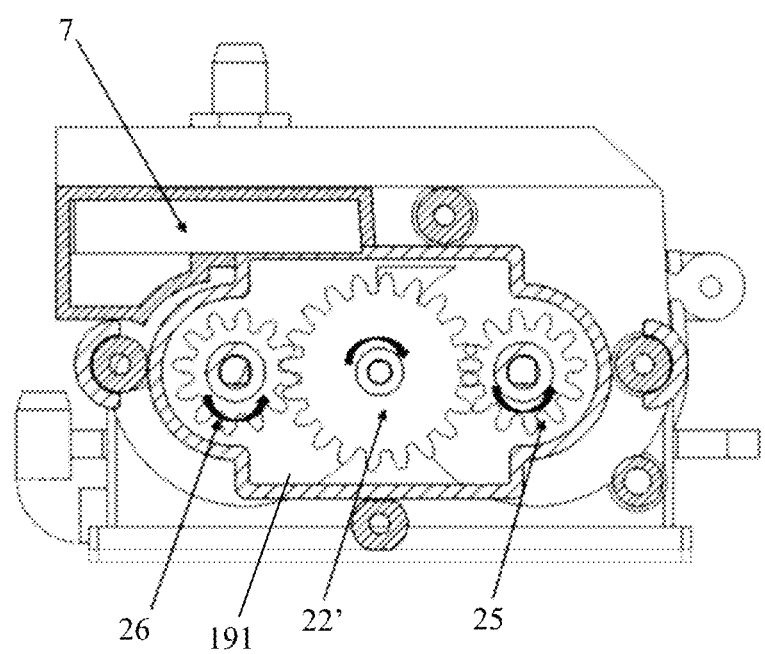
FIG. 31 is a longitudinal sectional view of the transmission chamber of the deodorizing device in the second embodiment of the second example according to the present disclosure.
Figure 32:
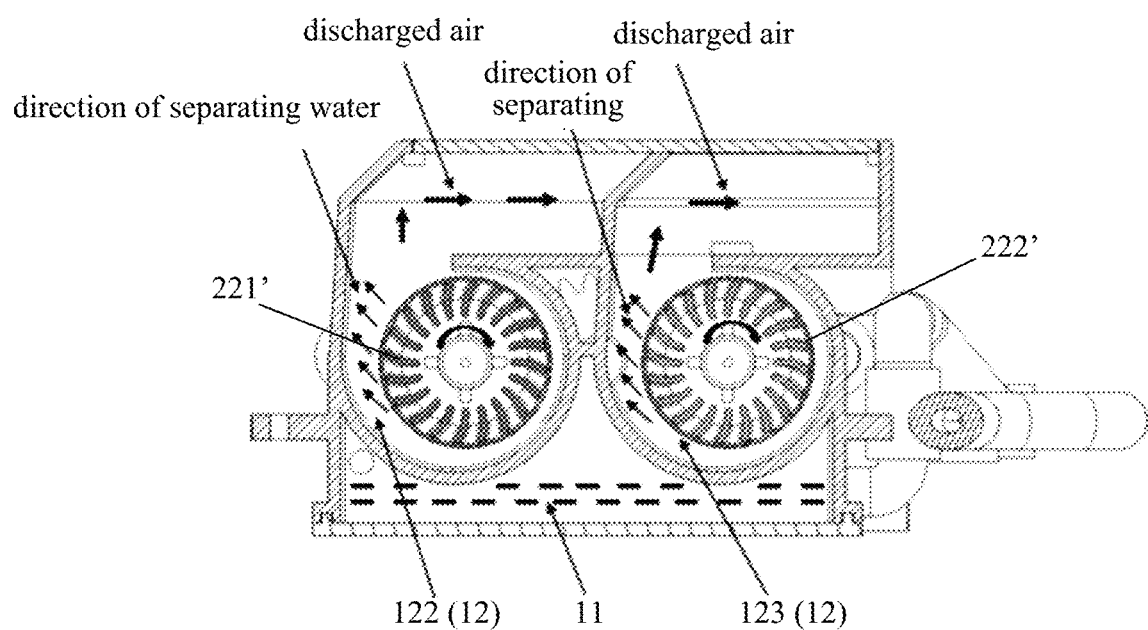
FIG. 32 is a longitudinal sectional view of the housing main body of the deodorizing device in the second embodiment of the second example according to the present disclosure.
Figure 33:
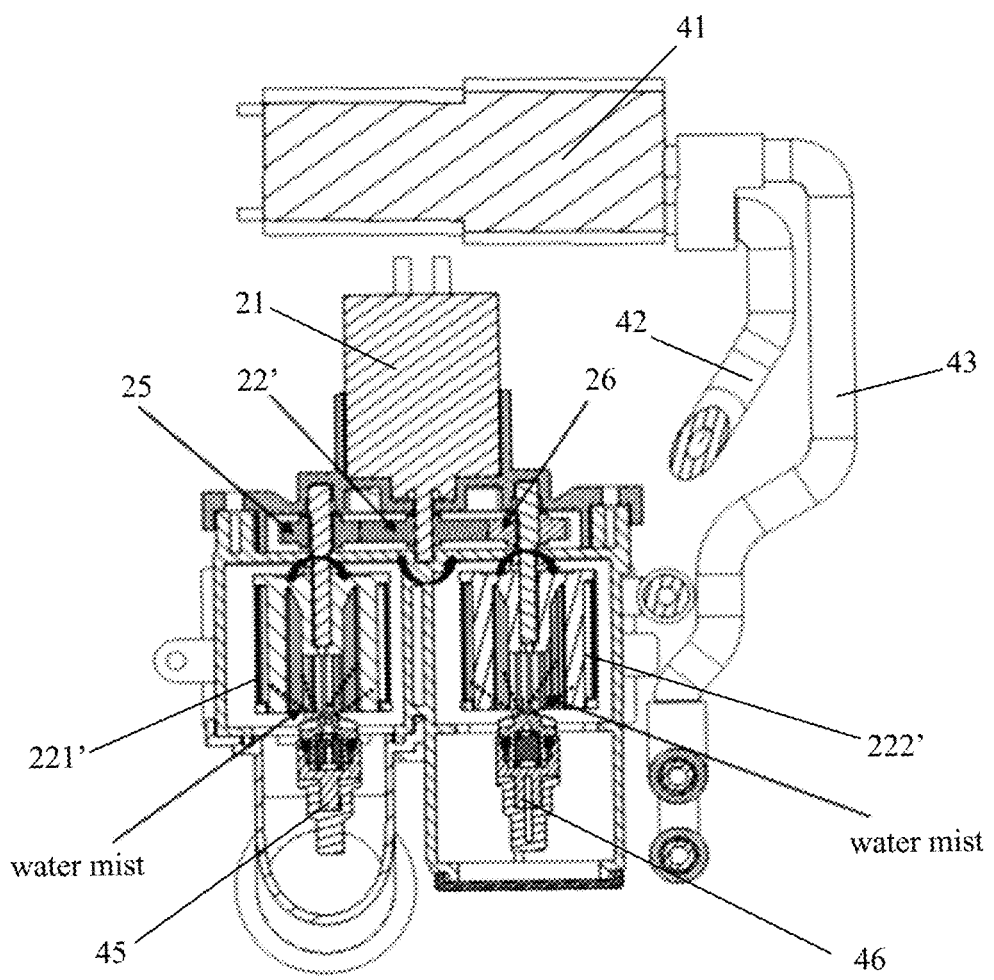
FIG. 33 is a lateral sectional view of the deodorizing device in the second embodiment of the second example according to the present disclosure.

As shown in FIGS. 28-33, the difference from the first embodiment is: the deodorizing device further includes a mist spraying assembly 4 which sucks water from the water storage chamber 11 and sprays water mist towards the air suction assembly 2. The vane wheels and the fine screens 23 are not immersed in water, but the water mist is sprayed toward the vane wheels and the fine screens 23 through the mist spraying assembly 4. Specifically, FIG. 28 is a perspective view of the deodorizing device in the second embodiment of the second example according to the present disclosure; FIG. 29 is an exploded view of the deodorizing device in the second embodiment of the second example according to the present disclosure; FIG. 30 is a top view of the deodorizing device in the second embodiment of the second example according to the present disclosure with a top cover omitted; FIG. 31 is a longitudinal sectional view of the transmission chamber of the deodorizing device in the second embodiment of the second example according to the present disclosure; FIG. 32 is a longitudinal sectional view of the housing main body of the deodorizing device in the second embodiment of the second example according to the present disclosure; FIG. 33 is a lateral sectional view of the deodorizing device in the second embodiment of the second example according to the present disclosure.

Specifically, as shown in FIGS. 28-29, the mist spraying assembly 4 includes a water pump 41, a water pump water inlet pipe 42, a water pump water outlet pipe 43, a first mist spraying head 45 and a second mist spraying head 46. The water pump water inlet pipe 42 is connected to the water storage chamber 11 and the water pump 41, and the water pump water outlet pipe 43 is connected to the water pump 41 and the first mist spraying head 45 and the second mist spraying head 46. The first mist spraying head 45 stretches into the inside of the first vane wheel 221', the second mist spraying head 46 stretches into the inside of the second vane wheel 222'.

Further, as shown in FIG. 29, the mist spraying assembly 4 further includes a first mist spraying head water inlet pipe 47 and a second mist spraying head water inlet pipe 48. The first mist spraying head water inlet pipe 47 is connected to the water pump water outlet pipe 43 and the first mist spraying head 45, the second mist spraying head water inlet pipe 48 is connected to the water pump water outlet pipe 43 and the second mist spraying head 46. The water pump water outlet pipe 43 is connected to the first mist spraying head water inlet pipe 47 and the second mist spraying head water inlet pipe 48 by a three-way valve 49.

The water in the water storage chamber 11 enters into the water pump 41 via the water pump water inlet pipe 42, and then enters into the three-way valve 49 via the water pump water outlet pipe 43, and then splits into two ways: one way of water enters into the first mist spraying head water inlet pipe 47, another way of water enters into the second mist spraying head water inlet pipe 48. The first mist spraying head water inlet pipe 47 is connected to the air inlet pipe 6, and the first mist spraying head 45 stretches into the inside of the first vane wheel 221' from the air inlet pipe 6. The second mist spraying head water inlet pipe 48 is connected to the top cover 13', and the second mist spraying head 46 stretches into the inside of the second vane wheel 222' from the top cover 13'.

While deodorizing, when the odor sucked in from the air inlet pipe 6 passes through the blade gaps of the first vane wheel 221', it must first penetrate through the first fine screen 231' outside the first vane wheel 221'. The main function of the first fine screen 231' is to disperse the odor sucked in as much as possible through micro holes, so that the air and the water mist as well as water in the first mixing chamber 122 are fully mixed through the high-speed rotation of the first vane wheel 221', and the main substances in the odor are filtered and dissolved. The one-stage deodorized air after filtering and cleaning enters into the connecting channel 16 from the first mixing chamber 122, and then enters into the second mixing chamber 123. When the one-stage deodorized air passes through the blade gaps of the second vane wheel 222', it must first penetrate through the second fine screen 232' outside the second vane wheel 222'. The main function of the second fine screen 232' is to disperse the odor sucked in as much as possible through micro holes, so that the one-stage deodorized air and the water mist as well as water in the second mixing chamber 123 are fully mixed through the high-speed rotation of the second vane wheel 222', and the main substances in the one-stage deodorized air are filtered and dissolved, the clean air after two-stage deodorization is obtained.

The water droplets attached to the first vane wheel 221' and the second vane wheel 222' are separated from the air under the action of the centrifugal force generated by the rotation of the vane wheels, and the separated water droplets are thrown to the inner side wall of the mixing chamber 12 and then slide down to the water storage chamber 11 so that the water pump 41 can suck in again and spray into the mixing chamber 12 in a cyclic manner to complete the deodorization process.

In a modification of the second embodiment, a dedicated water pump water chamber can be provided for supplying water to the water pump 41. The water pump water inlet pipe 42 is connected to the water pump water chamber and the water pump 41.

In an embodiment, the first mist spraying head 45 and the second mist spraying head 46 are not necessarily located inside the first vane wheel 221' and the second vane wheel 222', but may also be located at the front side or rear side of the first vane wheel 221' and the second vane wheel 222', and can also spray water mist toward the inside of the first vane wheel 221' and the second vane wheel 222'.

In the present disclosure, the odor brought by the user when using the toilet is fully stirred and mixed with water for filtering, and the main substances (ammonia, hydrogen sulfide, etc.) in the odor are dissolved in the water or filtered by the water to deodorize. The present disclosure solves the problem that at present when the activated carbon oxidation module is used for deodorization, the odor passes through the deodorization module too quickly which causes the deodorization efficiency is not high. Moreover, present disclosure also solves the problem that at present after the user uses the deodorization module for a period of time, the deodorization efficiency will decrease and the module function may be of possible failure and need to replace the deodorization module regularly.

In addition, since the main substances in the odor are easily soluble in water or can be filtered by water to deodorize, compared with using activated carbon to remove the main substances in the odor by adsorption or by the attached oxides, the deodorization is more direct and efficient, which improves the efficiency of deodorization and saves the costs.

The described above are only the principles and preferred embodiments of the present disclosure. It should be pointed out that for those of ordinary skill in the art, based on the principles of the present disclosure, several other modifications can be made, which should also be regarded as falling into the protection scope of the present disclosure.

I claim:

1. A deodorizing device comprising a housing; an air suction assembly; a water storage chamber; and a mixing chamber arranged in the housing,
    wherein the mixing chamber is located between the air suction assembly and the housing,
    wherein the air suction assembly is used for sucking odor, the odor and water vapor are mixed and deodorized in the mixing chamber,
    wherein clean air after deodorization is discharged from the housing,
    wherein the air suction assembly includes a drive motor, a vane wheel, and a fine screen,
    wherein the drive motor is used to drive the vane wheel to rotate,
    wherein the mixing chamber is located between the fine screen and the housing, and
    wherein the vane wheel includes at least two layers of coaxially arranged vane group with different diameters, and each layer of the vane group is covered with a ring of the fine screen.

2. The deodorizing device according to claim 1, wherein the fine screen is arranged on an outer periphery of the vane wheel.

3. The deodorizing device according to claim 1, wherein the water storage chamber is located below the mixing chamber, the vane wheel and the fine screen partly enter into the water storage chamber.

4. The deodorizing device according to claim 3, wherein the housing includes an air inlet, and the lower part of the air inlet is provided with a water retaining plate.

5. The deodorizing device according to claim 1, wherein the deodorizing device further includes a mist spraying assembly used for spraying water mist towards the air suction assembly.

6. The deodorizing device according to claim 5, wherein the mist spraying assembly includes a water pump, a water pump water inlet pipe, a water pump water outlet pipe, and a mist spraying head, and
wherein the water pump water outlet pipe is connected to the water pump and the mist spraying head, the mist spraying head is used to spray water to the inside of the vane wheel.

7. The deodorizing device according to claim 6,
wherein the deodorizing device further includes a transmission assembly and the transmission assembly includes a motor drive gear, an intermediate transmission shaft, an intermediate transmission gear, a vane wheel transmission gear, and a vane wheel transmission shaft, and
wherein the motor drive gear is mounted on a drive shaft of the drive motor, the intermediate transmission gear is mounted on the intermediate transmission shaft, the vane wheel transmission gear is mounted on the vane wheel transmission shaft, and the motor drive gear meshes with the intermediate transmission gear and the vane wheel transmission gear, and the intermediate transmission gear is used to drive the water pump to rotate.

8. The deodorizing device according to claim 7,
wherein the water pump is a gear pump, and the gear pump includes a water pump lower transmission shaft, a water pump lower transmission gear, a water pump upper transmission shaft, and two water pump front gears,
wherein the intermediate transmission gear meshes with the water pump lower transmission gear, the water pump lower transmission gear is mounted on the water pump lower transmission shaft, and the water pump lower transmission shaft drives the water pump upper transmission shaft to rotate, and
wherein one of the water pump front gears is mounted on the water pump upper transmission shaft, and the two water pump front gears mesh with each other.

9. An intelligent toilet, comprising a pedestal and a machine cover and further including a deodorizing device, wherein the deodorizing device comprising a housing, an air suction assembly, a water storage chamber, and a mixing chamber arranged in the housing,
wherein the mixing chamber is located between the air suction assembly and the housing,
wherein the air suction assembly is used for sucking odor, the odor and water vapor are mixed and deodorized in the mixing chamber,
wherein clean air after deodorization is discharged from the housing, and
wherein the deodorizing device is arranged inside the pedestal and the machine cover.

10. A deodorizing device comprising a housing; an air inlet pipe and an air outlet pipe respectively connected to the housing; an air suction assembly; a water storage chamber; and a mixing chamber arranged in the housing,
wherein the mixing chamber is located between the air suction assembly and the housing, the air suction assembly is used for sucking odor from the air inlet pipe,
wherein the odor and water vapor are mixed and deodorized in the mixing chamber,
wherein clean air after deodorization is discharged from the air outlet pipe,
wherein the mixing chamber includes a first mixing chamber and a second mixing chamber that are connected to each other through a connecting channel,
wherein the air inlet pipe is connected to the first mixing chamber directly,
wherein the air outlet pipe is connected to the second mixing chamber,
wherein the air suction assembly includes a drive motor, a drive shaft, an intermediate drive gear, a first vane wheel, a second vane wheel, a first fine screen, and a second fine screen,
wherein the drive motor is used to drive the drive shaft to rotate,
wherein the intermediate drive gear is nested on the drive shaft and drives the first vane wheel and the second vane wheel to rotate,
wherein the first vane wheel and the first fine screen are located inside the first mixing chamber, and
wherein the second vane wheel and the second fine screen are located inside the second mixing chamber.

11. The deodorizing device according to claim 10,
wherein the air suction assembly further includes a first side gear and a second side gear,
wherein the intermediate drive gear meshes with the first side gear and the second side gear respectively,
wherein the first side gear drives the first vane wheel to rotate, and
wherein the second side gear drives the second vane wheel to rotate.

12. The deodorizing device according to claim 10,
wherein the water storage chamber is located below the first mixing chamber and the second mixing chamber, and
wherein the first vane wheel, the second vane wheel, the first fine screen, and the second fine screen partly enter into the water storage chamber.

13. The deodorizing device according to claim 12, wherein the housing includes an air inlet, and the lower part of the connection between the air inlet and the air inlet pipe is provided with a water retaining plate.

14. The deodorizing device according to claim 10, wherein the deodorizing device further includes a mist spraying assembly used for spraying water mist towards the air suction assembly.

15. The deodorizing device according to claim 14,
wherein the mist spraying assembly includes a water pump, a water pump water inlet pipe, a water pump water outlet pipe, a first mist spraying head, and a second mist spraying head,
wherein the water pump water outlet pipe is connected to the water pump as well as the first mist spraying head and the second mist spraying head, and
wherein the first mist spraying head is used to spray water to the inside of the first vane wheel, and the second mist spraying head is used to spray water to the inside of the second vane wheel.

16. The deodorizing device according to claim 13,
wherein the housing includes a housing main body, a front cover, a motor fixing rear plate, a top cover, and a water storage chamber bottom plate,
wherein the housing main body is provided with the first mixing chamber and the second mixing chamber inside, a front side of the housing main body is provided with the air inlet and a connecting channel opening,
wherein the front cover is arranged to cover the connecting channel opening,
wherein the motor fixing rear plate is connected to a rear side of the housing main body, the drive motor is mounted at the rear side of the motor fixing rear plate, the drive shaft passes through the motor fixing rear plate and enters into a transmission chamber between the housing main body and the motor fixing rear plate, and the intermediate drive gear, a first side gear, and a second side gear are arranged inside the transmission chamber,
wherein the top cover is connected to a top part of the housing main body for sealing the upper parts of the first mixing chamber, the connecting channel and the second mixing chamber, and
wherein the water storage chamber bottom plate is connected to a bottom part of the housing main body, the water storage chamber is formed therebetween.

* * * * *